(12) United States Patent
Kamada

(10) Patent No.: US 12,366,736 B2
(45) Date of Patent: Jul. 22, 2025

(54) IMAGING LENS

(71) Applicant: Tokyo Visionary Optics Co., Ltd., Tokyo (JP)

(72) Inventor: Kenichi Kamada, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 509 days.

(21) Appl. No.: 17/454,183

(22) Filed: Nov. 9, 2021

(65) Prior Publication Data
US 2022/0317422 A1 Oct. 6, 2022

(30) Foreign Application Priority Data

Sep. 9, 2020 (JP) ................................. 2020-151519

(51) Int. Cl.
*G02B 9/62* (2006.01)
*G02B 13/18* (2006.01)

(52) U.S. Cl.
CPC ............... *G02B 13/18* (2013.01); *G02B 9/62* (2013.01)

(58) Field of Classification Search
CPC ....................... G02B 13/0015; G02B 13/0045; G02B 13/18; G02B 9/62; G03B 30/00
See application file for complete search history.

(56) References Cited

U.S. PATENT DOCUMENTS

| | | | | |
|---|---|---|---|---|
| 2014/0368931 A1* | 12/2014 | Noda | ........................ | G02B 9/62 359/740 |
| 2016/0161716 A1* | 6/2016 | Chae | .................... | G02B 13/0045 359/713 |
| 2016/0223796 A1* | 8/2016 | Lee | ........................... | G02B 9/62 |
| 2018/0239113 A1 | 8/2018 | Dai | | |
| 2019/0302410 A1 | 10/2019 | Chen | | |
| 2019/0302416 A1* | 10/2019 | Chen | ......................... | G02B 9/62 |

FOREIGN PATENT DOCUMENTS

| | | |
|---|---|---|
| CN | 110286474 A | 9/2019 |
| CN | 111025585 A | 4/2020 |
| JP | 2019032462 A | 2/2019 |

OTHER PUBLICATIONS

Melles Griot Practical Application of Light: Catalogue, "Lens Shape"; "Aberration Balancing"; 1999, pp. 1.17, 1.27-1.28 (Year: 1999).*
Frank L. Pedrotti, "Geometrical Optics", 2007, Introduction to Optics, Pearson Prentice-Hall, pp. 16-49 (Year: 2007).*

* cited by examiner

*Primary Examiner* — Wyatt A Stoffa
*Assistant Examiner* — Samanvitha Sridhar
(74) *Attorney, Agent, or Firm* — Maine Cernota & Curran

(57) ABSTRACT

There is provided an imaging lens with excellent optical characteristics which satisfies demand of a low profile and a low F-number. An imaging lens comprises in order from an object side to an image side, a first lens with negative refractive power, a second lens with positive refractive power, a third lens with positive refractive power, a fourth lens with negative refractive power, a fifth lens with positive refractive power, and a sixth lens with negative refractive power, wherein said first lens has an object-side surface being concave in a paraxial region, said fourth lens has an image-side surface being concave in a paraxial region, and said sixth lens has an image-side surface being concave in a paraxial region, and predetermined conditional expressions are satisfied.

7 Claims, 12 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN111025585A) discloses an imaging lens in order from an object side, a first lens with negative refractive power, a second lens with positive refractive power, a third lens with positive refractive power, a fourth lens with positive refractive power, a fifth lens with negative refractive power, and a sixth lens with positive refractive power, wherein an angle of view of the imaging lens, a relationship between a curvature radius of an object-side surface of the second lens and a curvature radius of an image-side surface of the second lens, and a relationship between a distance along an optical axis from an image-side surface of the first lens to the object-side surface of the second lens and a distance along the optical axis from the image-side surface of the second lens to an object-side surface of the third lens satisfy certain conditions.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

Means for Solving Problems

An imaging lens according to the present invention comprises, in order from an object side to an image side, a first lens with negative refractive power, a second lens with positive refractive power, a third lens with positive refractive power, a fourth lens with negative refractive power, a fifth lens with positive refractive power, and a sixth lens with negative refractive power, wherein said first lens has an object-side surface being concave in a paraxial region, said fourth lens has an image-side surface being concave in a paraxial region, and said sixth lens has an image-side surface being concave in a paraxial region.

The first lens has the negative refractive power and aspheric surfaces on both sides, and the object-side surface is concave in a paraxial region. Therefore, chromatic aberration, coma aberration, astigmatism, and distortion are suppressed.

The second lens has the positive refractive power and aspheric surfaces on both sides. Therefore, the coma aberration, the astigmatism, field curvature, and the distortion are properly corrected.

The third lens has the positive refractive power and aspheric surfaces on both sides. Therefore, reduction in a profile is achieved, and spherical aberration, the coma aberration, the astigmatism, the field curvature, and the distortion are properly corrected.

The fourth lens has the negative refractive power and aspheric surfaces on both sides, and the image-side surface is concave in a paraxial region. Therefore, the chromatic aberration, the coma aberration, the astigmatism, the field curvature, and the distortion are properly corrected.

The fifth lens has the positive refractive power and aspheric surfaces on both sides. Therefore, reduction in a profile is achieved, and the spherical aberration, the coma aberration, the astigmatism, the field curvature, and the distortion are properly corrected.

The sixth lens has the negative refractive power and aspheric surfaces on both sides. Therefore, the chromatic aberration, the astigmatism, the field curvature, and the distortion are properly corrected. Furthermore, the sixth lens has the image-side surface being concave in the paraxial region, and maintains a low profile and secures a back focus.

According to the imaging lens having the above-described configuration, it is preferable that the object-side surface of the first lens is formed as an aspheric surface having at least one pole point in a position off the optical axis.

When the object-side surface of the first lens is formed as an aspheric surface having at least one pole point in a position off the optical axis, the astigmatism and the distortion are suppressed.

According to the imaging lens having the above-described configuration, it is preferable that an image-side surface of the first lens is concave in the paraxial region.

When the image-side surface of the first lens is concave in the paraxial region, the coma aberration, the astigmatism, and the distortion are properly corrected.

According to the imaging lens having the above-described configuration, it is preferable that an object-side surface of the sixth lens is convex in the paraxial region.

When the object-side surface of the sixth lens is convex in the paraxial region, the astigmatism, the field curvature, and the distortion are properly corrected.

According to the imaging lens having the above-described configuration, it is preferable that the object-side surface of the sixth lens is formed as an aspheric surface having at least one pole point in a position off the optical axis.

When the object-side surface of the sixth lens is formed as an aspheric surface having at least one pole point in a position off the optical axis, the astigmatism, the field curvature, and the distortion are more properly corrected.

According to the imaging lens having the above-described configuration, it is preferable that the image-side surface of the sixth lens is formed as an aspheric surface having at least one pole point in a position off the optical axis.

When the image-side surface of the sixth lens is formed as an aspheric surface having at least one pole point in a position off the optical axis, the astigmatism, the field curvature, and the distortion are more properly corrected.

The imaging lens according to the present invention, due to the above-mentioned configuration, achieves a low profile which a ratio of a total track length to a diagonal length of an effective image area of the image sensor is 1.10 or less and a low F number of 2.3 or less.

According to the imaging lens having the above-described configuration, it is preferable that the following conditional expression (1) is satisfied:

$$0.30 < r3/f < 4.00 \quad (1)$$

where
$r3$: a paraxial curvature radius of an object-side surface of the second lens, and
$f$: a focal length of the overall optical system of the imaging lens.

The conditional expression (1) defines an appropriate range of the paraxial curvature radius of the object-side surface of the second lens. By satisfying the conditional expression (1), the coma aberration, the astigmatism, the field curvature, and the distortion can be properly corrected.

According to the imaging lens having the above-described configuration, it is preferable that the following conditional expression (2) is satisfied:

$$1.80 < r11/(T5+D6) < 9.00 \quad (2)$$

where
$r11$: a paraxial curvature radius of an object-side surface of the sixth lens,
$T5$: a distance along the optical axis from an image-side surface of the fifth lens to an object-side surface of the sixth lens, and
$D6$: a thickness along the optical axis of the sixth lens.

The conditional expression (2) defines an appropriate range of a relationship among the paraxial curvature radius of the object-side surface of the sixth lens, the distance along the optical axis from the image-side surface of the fifth lens to the object-side surface of the sixth lens, and the thickness along the optical axis of the sixth lens. By satisfying the conditional expression (2), reduction in the profile can be achieved, and the astigmatism, the field curvature, and the distortion can be properly corrected.

According to the imaging lens having the above-described configuration, it is preferable that the following conditional expression (3) is satisfied:

$$11.00 < r3/(T2/T1) \quad (3)$$

where
$r3$: a paraxial curvature radius of an object-side surface of the second lens,
$T2$: a distance along the optical axis from an image-side surface of the second lens to an object-side surface of the third lens, and
$T1$: a distance along the optical axis from an image-side surface of the first lens to an object-side surface of the second lens.

The conditional expression (3) defines an appropriate range of a relationship among the paraxial curvature radius of the object-side surface of the second lens, the distance along the optical axis from the image-side surface of the second lens to the object-side surface of the third lens, and the distance along the optical axis from the image-side surface of the first lens to the object-side surface of the second lens. By satisfying the conditional expression (3), reduction in the profile can be achieved, and the coma aberration, the astigmatism, the field curvature, and the distortion can be properly corrected.

According to the imaging lens having the above-described configuration, it is preferable that the following conditional expression (4) is satisfied:

$$10.00 < vd2 < 40.00 \quad (4)$$

where
$vd2$: an abbe number at d-ray of the second lens.

The conditional expression (4) defines an appropriate range of the abbe number at d-ray of the second lens. By satisfying the conditional expression (4), the chromatic aberration can be properly corrected.

According to the imaging lens having the above-described configuration, it is preferable that the following conditional expression (5) is satisfied:

$$0.10 < (T5/TTL) \times 100 < 3.00 \quad (5)$$

where
$T5$: a distance along the optical axis from an image-side surface of the fifth lens to an object-side surface of the sixth lens, and
$TTL$: a total track length.

The conditional expression (5) defines an appropriate range of the distance along the optical axis from the image-side surface of the fifth lens to the object-side surface of the sixth lens. By satisfying the conditional expression (5), the astigmatism, the field curvature, and the distortion can be properly corrected.

According to the imaging lens having the above-described configuration, it is preferable that the following conditional expression (6) is satisfied:

$$-29.00 < r1/(D1+T1) < -4.10 \quad (6)$$

where
$r1$: a paraxial curvature radius of an object-side surface of the first lens,
$D1$: a thickness along the optical axis of the first lens, and
$T1$: a distance along the optical axis from an image-side surface of the first lens to an object-side surface of the second lens.

The conditional expression (6) defines an appropriate range of a relationship among the paraxial curvature radius of the object-side surface of the first lens, the distance along the optical axis of the first lens, and the distance along the optical axis from the image-side surface of the first lens to the object-side surface of the second lens. By satisfying the conditional expression (6), reduction in the profile can be achieved, and the coma aberration, the astigmatism, and the distortion can be properly corrected.

According to the imaging lens having the above-described configuration, it is preferable that the following conditional expression (7) is satisfied:

$$r10/T5 < -6.25 \quad (7)$$

where
- r10: a paraxial curvature radius of an image-side surface of the fifth lens, and
- T5: a distance along the optical axis from an image-side surface of the fifth lens to an object-side surface of the sixth lens.

The conditional expression (7) defines an appropriate range of a relationship between the paraxial curvature radius of the image-side surface of the fifth lens and the distance along the optical axis from the image-side surface of the fifth lens to the object-side surface of the sixth lens. By satisfying the conditional expression (7), reduction in the profile can be achieved, and the astigmatism, the field curvature, and the distortion can be properly corrected.

According to the imaging lens having the above-described configuration, it is preferable that the following conditional expression (8) is satisfied:

$$16.00 < r11/T5 < 200.00 \quad (8)$$

where
- r11: a paraxial curvature radius of an object-side surface of the sixth lens, and
- T5: a distance along the optical axis from an image-side surface of the fifth lens to an object-side surface of the sixth lens.

The conditional expression (7) defines an appropriate range of a relationship between the paraxial curvature radius of the image-side surface of the fifth lens and the distance along the optical axis from the image-side surface of the fifth lens to the object-side surface of the sixth lens. By satisfying the conditional expression (7), reduction in the profile can be achieved, and the astigmatism, the field curvature, and the distortion can be properly corrected.

According to the imaging lens having the above-described configuration, it is preferable that the following conditional expression (8) is satisfied:

$$16.00 < r11/T5 < 200.00 \quad (8)$$

where
- r11: a paraxial curvature radius of an object-side surface of the sixth lens, and
- T5: a distance along the optical axis from an image-side surface of the fifth lens to an object-side surface of the sixth lens.

The conditional expression (8) defines an appropriate range of a relationship between the paraxial curvature radius of the object-side surface of the sixth lens and the distance along the optical axis from the image-side surface of the fifth lens to the object-side surface of the sixth lens. By satisfying the conditional expression (8), reduction in the profile can be achieved, and the astigmatism, the field curvature, and the distortion can be properly corrected.

According to the imaging lens having the above-described configuration, it is preferable that the following conditional expression (9) is satisfied:

$$10.00 < vd6 < 40.00 \quad (9)$$

where
- vd6: an abbe number at d-ray of the sixth lens.

The conditional expression (9) defines an appropriate range of the abbe number at d-ray of the sixth lens. By satisfying the conditional expression (9), the chromatic aberration can be properly corrected.

According to the imaging lens having the above-described configuration, it is preferable that the following conditional expression (10) is satisfied:

$$1.90 < T4/T5 < 20.00 \quad (10)$$

where
- T4: a distance along the optical axis from an image-side surface of the fourth lens to an object-side surface of the fifth lens, and
- T5: a distance along the optical axis from an image-side surface of the fifth lens to an object-side surface of the sixth lens.

The conditional expression (10) defines an appropriate range of a relationship between the distance along the optical axis from the image-side surface of the fourth lens to the object-side surface of the fifth lens and the distance along the optical axis from the image-side surface of the fifth lens to the object-side surface of the sixth lens. By satisfying the conditional expression (10), reduction in the profile can be achieved, and the coma aberration, the astigmatism, the field curvature, and the distortion can be properly corrected.

According to the imaging lens having the above-described configuration, it is preferable that the following conditional expression (11) is satisfied:

$$-3.65 < (T5/f6) \times 100 < -0.50 \quad (11)$$

where
- T5: a distance along the optical axis from an image-side surface of the fifth lens to an object-side surface of the sixth lens, and
- f6: a focal length of the sixth lens.

The conditional expression (11) defines an appropriate range of a relationship between the distance along the optical axis from the image-side surface of the fifth lens to the object-side surface of the sixth lens and the focal length of the sixth lens. By satisfying the conditional expression (11), reduction in the profile can be achieved, and the chromatic aberration, the astigmatism, the field curvature, and the distortion can be properly corrected.

According to the imaging lens having the above-described configuration, it is preferable that the following conditional expression (12) is satisfied:

$$-0.60 < f1/f2 < -0.05 \quad (12)$$

where
- f1: a focal length of the first lens, and
- f2: a focal length of the second lens.

The conditional expression (12) defines an appropriate range of a relationship between the focal length of the first lens and the focal length of the second lens. By satisfying the conditional expression (12), the chromatic aberration, the coma aberration, the astigmatism, the field curvature, and the distortion can be properly corrected.

According to the imaging lens having the above-described configuration, it is preferable that the following conditional expression (13) is satisfied:

$$2.20 < f2/f < 14.50 \quad (13)$$

where
- f2: a focal length of the second lens, and
- f: a focal length of the overall optical system of the imaging lens.

The conditional expression (13) defines an appropriate range of the focal length of the second lens. By satisfying the conditional expression (13), the coma aberration, the astigmatism, the field curvature, and the distortion can be properly corrected.

According to the imaging lens having the above-described configuration, it is preferable that the following conditional expression (14) is satisfied:

$$-10.00 < f6/D6 < -1.00 \quad (14)$$

where f6: a focal length of the sixth lens, and

D6: a thickness along the optical axis of the sixth lens.

The conditional expression (14) defines an appropriate range of a relationship between the focal length of the sixth lens and the thickness along the optical axis of the sixth lens. By satisfying the conditional expression (14), reduction in the profile can be achieved, and the chromatic aberration, the astigmatism, the field curvature, and the distortion can be properly corrected.

According to the imaging lens having the above-described configuration, it is preferable that the following conditional expression (15) is satisfied:

$$0.45 < f6/f1 < 1.50 \tag{15}$$

where f6: a focal length of the sixth lens, and f1: a focal length of the first lens.

The conditional expression (15) defines an appropriate range of a relationship between the focal length of the sixth lens and the focal length of the first lens. By satisfying the conditional expression (15), the chromatic aberration, the coma aberration, the astigmatism, the field curvature, and the distortion can be properly corrected.

According to the imaging lens having the above-described configuration, it is preferable that the following conditional expression (16) is satisfied:

$$-15.50 < r1/f < -2.00 \tag{16}$$

where r1: a paraxial curvature radius of an object-side surface of the first lens, and f: a focal length of the overall optical system of the imaging lens.

The conditional expression (16) defines an appropriate range of the paraxial curvature radius of the object-side surface of the first lens. By satisfying the conditional expression (16), the coma aberration, the astigmatism, and the distortion can be properly corrected.

According to the imaging lens having the above-described configuration, it is preferable that the following conditional expression (17) is satisfied:

$$-1.55 < r2/r1/D1 < -0.15 \tag{17}$$

where r2: a paraxial curvature radius of an image-side surface of the first lens, r1: a paraxial curvature radius of an object-side surface of the first lens, and D1: a thickness along the optical axis of the first lens.

The conditional expression (17) defines an appropriate range of a relationship among the paraxial curvature radius of the image-side surface of the first lens, the paraxial curvature radius of the object-side surface of the first lens, and the thickness along the optical axis of the first lens. By satisfying the conditional expression (17), reduction in the profile can be achieved, and the coma aberration, the astigmatism, and the distortion can be properly corrected.

According to the imaging lens having the above-described configuration, it is preferable that the following conditional expression (18) is satisfied:

$$20.00 < r4/(T2/T1) < 200.00 \tag{18}$$

where r4: a paraxial curvature radius of an image-side surface of the second lens, T2: a distance along the optical axis from an image-side surface of the second lens to an object-side surface of the third lens, and T1: a distance along the optical axis from an image-side surface of the first lens to an object-side surface of the second lens.

The conditional expression (18) defines an appropriate range of a relationship among the paraxial curvature radius of the image-side surface of the second lens, the distance along the optical axis from the image-side surface of the second lens to the object-side surface of the third lens, and the distance along the optical axis from an image-side surface of the first lens to an object-side surface of the second lens. By satisfying the conditional expression (18), reduction in the profile can be achieved, and the coma aberration, the field curvature, and the distortion can be properly corrected.

According to the imaging lens having the above-described configuration, it is preferable that the following conditional expression (19) is satisfied:

$$-1.75 < r6/r11 < -0.30 \tag{19}$$

where r6: a paraxial curvature radius of an image-side surface of the third lens, and r11: a paraxial curvature radius of an object-side surface of the sixth lens.

The conditional expression (19) defines an appropriate range of a relationship between the paraxial curvature radius of the image-side surface of the third lens and the paraxial curvature radius of the object-side surface of the sixth lens. By satisfying the conditional expression (19), the spherical aberration, the coma aberration, the astigmatism, the field curvature, and the distortion can be properly corrected.

According to the imaging lens having the above-described configuration, it is preferable that the following conditional expression (20) is satisfied:

$$2.00 < |r9|/f < 150.00 \tag{20}$$

where r9: a paraxial curvature radius of an object-side surface of the fifth lens, and f: a focal length of the overall optical system of the imaging lens.

The conditional expression (20) defines an appropriate range of the paraxial curvature radius of the object-side surface of the fifth lens. By satisfying the conditional expression (20), the coma aberration, the astigmatism, the field curvature, and the distortion can be properly corrected.

According to the imaging lens having the above-described configuration, it is preferable that the following conditional expression (21) is satisfied:

$$-1.00 < r10/f < -0.10 \tag{21}$$

where r10: a paraxial curvature radius of an image-side surface of the fifth lens, and f: a focal length of the overall optical system of the imaging lens.

The conditional expression (21) defines an appropriate range of the paraxial curvature radius of the image-side surface of the fifth lens. By satisfying the conditional expression (21), the astigmatism, the field curvature, and the distortion can be properly corrected.

According to the imaging lens having the above-described configuration, it is preferable that the following conditional expression (22) is satisfied:

$$0.80 < r11/f < 2.50 \qquad (22)$$

where r11: a paraxial curvature radius of an object-side surface of the sixth lens, and f: a focal length of the overall optical system of the imaging lens.

The conditional expression (22) defines an appropriate range of the paraxial curvature radius of the object-side surface of the sixth lens. By satisfying the conditional expression (22), the astigmatism, the field curvature, and the distortion can be properly corrected.

According to the imaging lens having the above-described configuration, it is preferable that the following conditional expression (23) is satisfied:

$$-2.50 < r11/f6 < -0.45 \qquad (23)$$

where r11: a paraxial curvature radius of an object-side surface of the sixth lens, and f6: a focal length of the sixth lens.

The conditional expression (23) defines an appropriate range of a relationship between the paraxial curvature radius of the object-side surface of the sixth lens and the focal length of the sixth lens. By satisfying the conditional expression (23), the chromatic aberration, the astigmatism, the field curvature, and the distortion can be properly corrected.

According to the imaging lens having the above-described configuration, it is preferable that the following conditional expression (24) is satisfied:

$$1.85 < r11/r12 < 6.00 \qquad (24)$$

where r11: a paraxial curvature radius of an object-side surface of the sixth lens, and r12: a paraxial curvature radius of an image-side surface of the sixth lens.

The conditional expression (24) defines an appropriate range of a relationship between the paraxial curvature radius of the object-side surface of the sixth lens and the paraxial curvature radius of the image-side surface of the sixth lens. By satisfying the conditional expression (24), the astigmatism, the field curvature, and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11, 13, 15, 17, 19, 21, and 23 are schematic views of the imaging lenses in Examples 1 to 12 according to the embodiments of the present invention, respectively. The preferred embodiments of the present invention will be described in detail below referring to FIG. 1.

Figure 1:
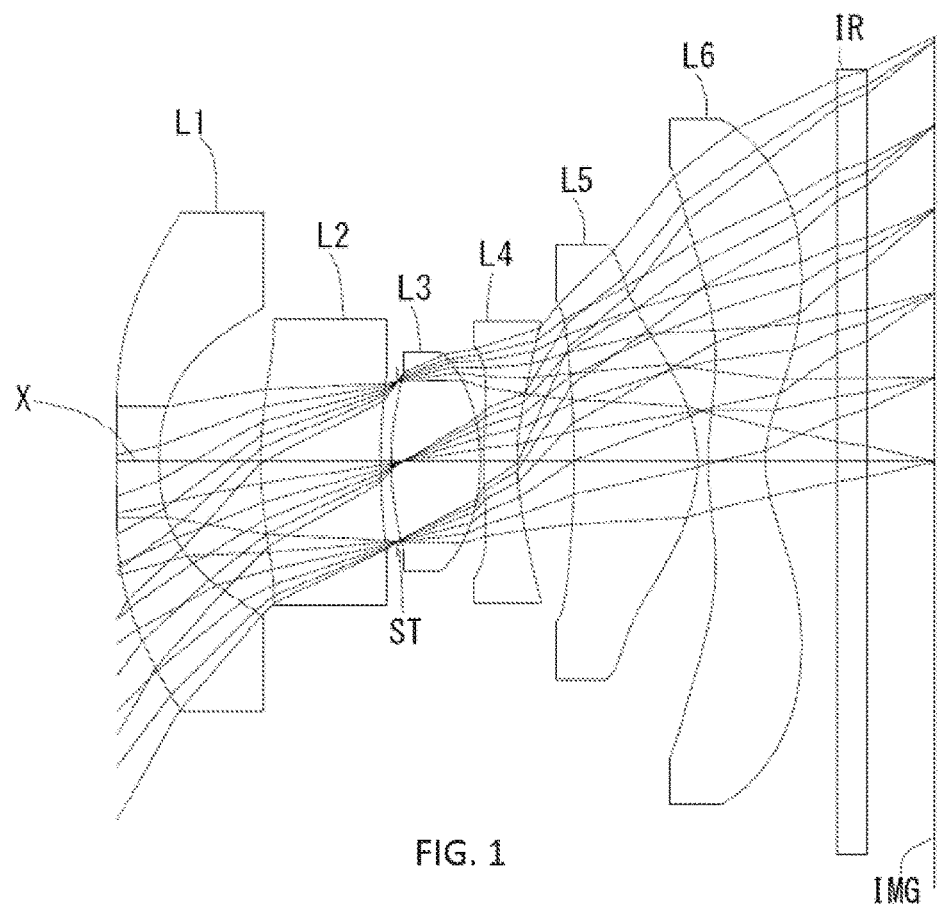
FIG. 1 is a schematic view showing an imaging lens in Example 1 according to the present invention.

As shown in FIG. 1, the imaging lens according to the present invention comprises, in order from an object side to an image side, a first lens L1 with negative refractive power, a second lens L2 with positive refractive power, a third lens L3 with positive refractive power, a fourth lens L4 with negative refractive power, a fifth lens L5 with positive refractive power, and a sixth lens L6 with negative refractive power, wherein said first lens L1 has an object-side surface being concave in a paraxial region, said fourth lens L4 has an image-side surface being concave in a paraxial region, and said sixth lens L6 has an image-side surface being concave in a paraxial region.

A filter IR such as an IR cut filter or a cover glass is arranged between the sixth lens L6 and an image plane IMG (namely, the image plane of an image sensor). The filter IR is omissible.

By arranging an aperture stop ST between the second lens L2 and the third lens L3, correction of distortion become facilitated. A position of the aperture stop ST is not limited to that between the second lens L2 and the third lens L3. The aperture stop ST may be appropriately arranged according to a specification of the image sensor.

The first lens L1 has the negative refractive power and is formed in a biconcave shape having an object-side surface being concave and an image-side surface being concave in the paraxial region (near the optical axis X). Furthermore, both-side surfaces of the first lens L1 are formed as aspheric surfaces. Therefore, chromatic aberration, coma aberration, astigmatism, and distortion are suppressed.

The aspheric surface formed on the object-side surface of the first lens L1 has at least one pole point in a position off the optical axis X. Therefore, the astigmatism and the distortion are properly corrected.

The second lens L2 has the positive refractive power and is formed in a meniscus shape having an object-side surface being convex and an image-side surface being concave in the paraxial region. Furthermore, both-side surfaces of the second lens L2 are formed as aspheric surfaces. Therefore, reduction in a profile is achieved, and the coma aberration, the astigmatism, field curvature, and the distortion are properly corrected.

The third lens L3 has the positive refractive power and is formed in a biconvex shape having an object-side surface being convex and an image-side surface being convex in the paraxial region. Furthermore, both-side surfaces of the third lens L3 are formed as aspheric surfaces. Therefore, spherical aberration, the coma aberration, the astigmatism, field curvature, and the distortion are properly corrected.

The fourth lens L4 has the negative refractive power and is formed in a meniscus shape having an object-side surface being convex and an image-side surface being concave in the paraxial region. Furthermore, both-side surfaces of the fourth lens L4 are formed as aspheric surfaces. Therefore, the chromatic aberration, the coma aberration, the astigmatism, the field curvature, and the distortion are properly corrected.

Figure 3:
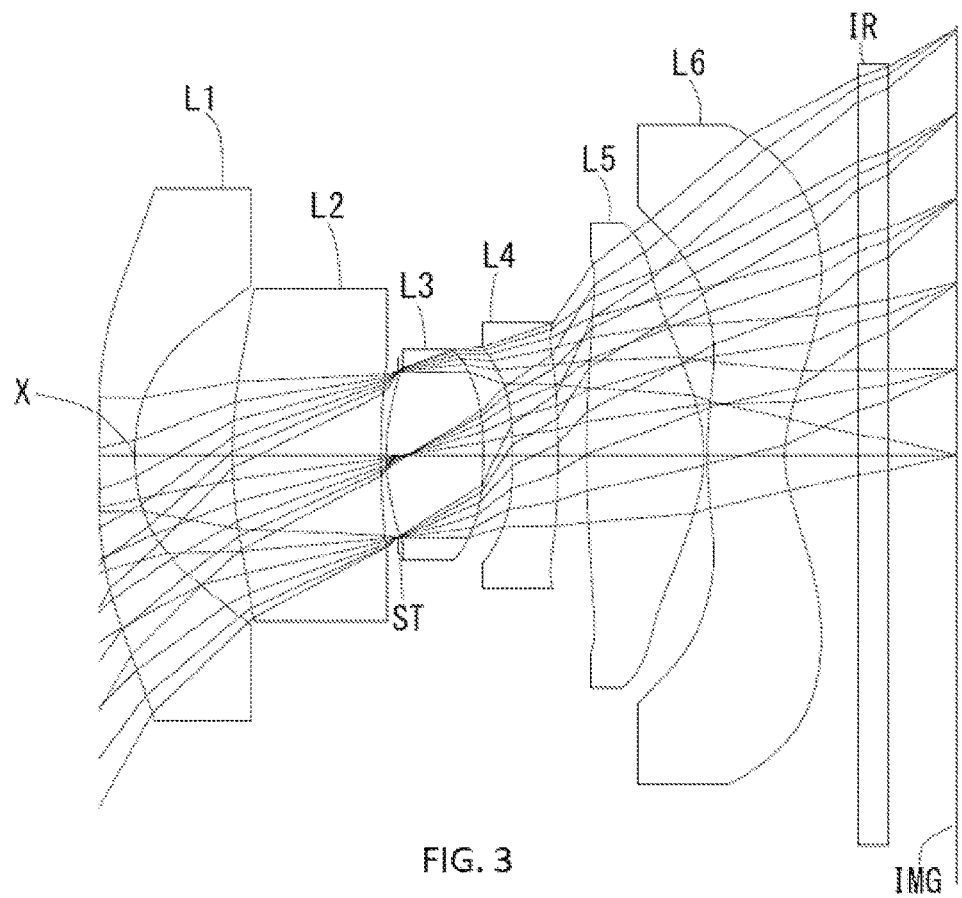
FIG. 3 is a schematic view showing an imaging lens in Example 2 according to the present invention.
Figure 5:
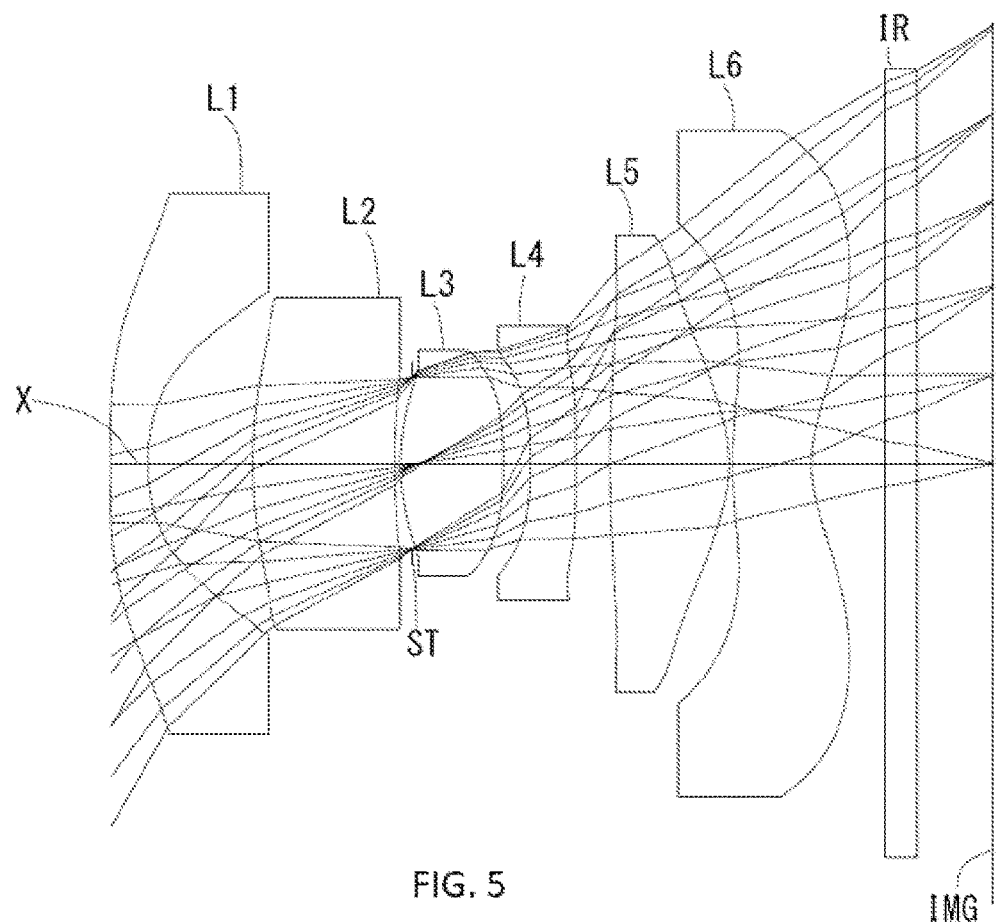
FIG. 5 is a schematic view showing an imaging lens in Example 3 according to the present invention.

A shape of the fourth lens L4 may be a meniscus shape having the object-side surface being concave and the image-side surface being convex in the paraxial region as in Examples 2 and 3 shown in FIGS. 3 and 5. In this case, such a configuration is favorable for correction of the chromatic aberration, the coma aberration, the astigmatism, and the distortion. In addition, the shape of the fourth lens L4 may be a biconcave shape having the object-side surface being concave and the image-side surface being concave in the paraxial region as in Examples 4, 5, 6, 7, 8, 9, 10, and 11 shown in FIGS. 7, 9, 11, 13, 15, 17, 19, and 21. In this case, the negative refractive powers on the both sides are favorable for correction of the chromatic aberration.

The fifth lens L5 has the positive refractive power and is formed in a meniscus shape having an object-side surface being concave and an image-side surface being convex in the paraxial region. Furthermore, both-side surfaces of the fifth lens L5 are formed as aspheric surfaces. Therefore, the spherical aberration, the coma aberration, the astigmatism, field curvature, and the distortion are properly corrected.

Figure 23:
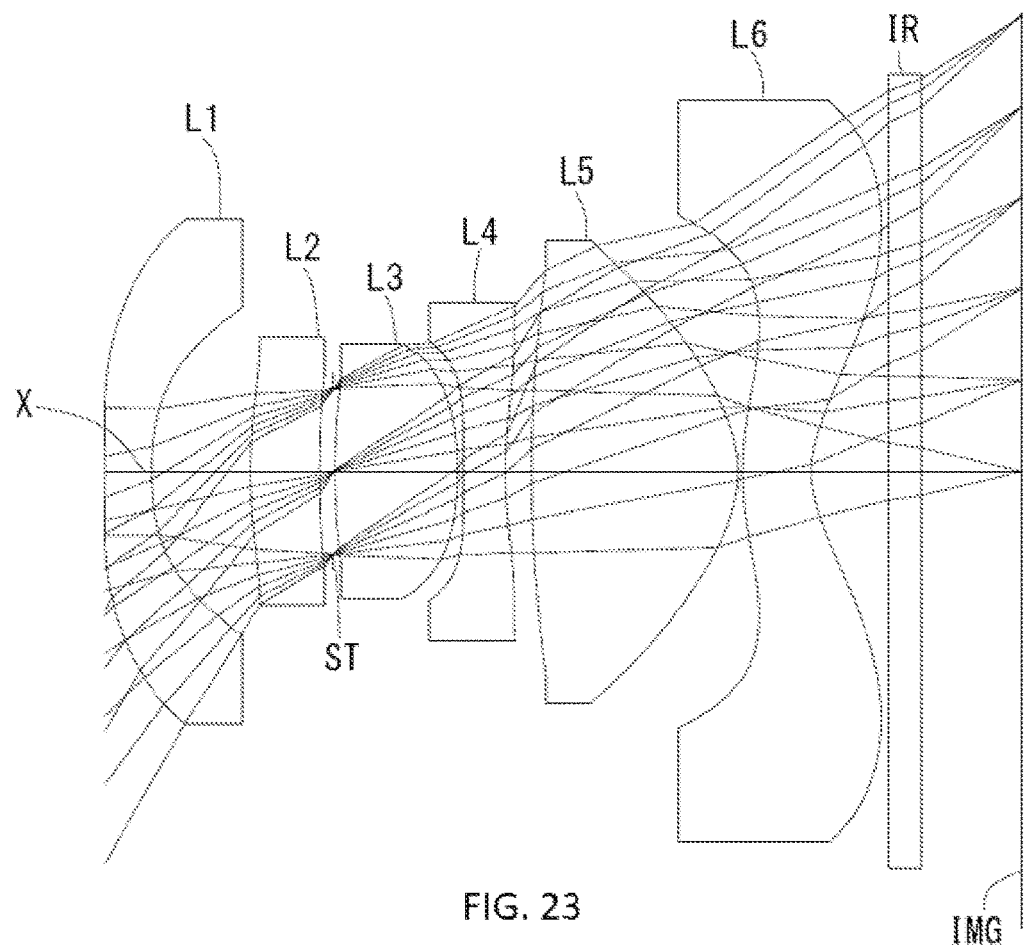
FIG. 23 shows a schematic view showing an imaging lens in Example 12 according to the present invention.

A shape of the fifth lens L5 may be a biconvex shape having the object-side surface being convex and the image-side surface being convex in the paraxial region as in Examples 2, 3 and 12 shown in FIGS. 3, 5 and 23. In this case, positive refractive powers on the both sides are favorable for reduction in the profile.

The sixth lens L6 has the negative refractive power and is formed in a meniscus shape having an object-side surface being convex and the image-side surface being concave in the paraxial region. Furthermore, both-side surfaces of the sixth lens L6 are formed as aspheric surfaces. Therefore, the chromatic aberration, the astigmatism, the field curvature, and the distortion are properly corrected. When the image-side surface of the sixth lens L6 is concave in the paraxial region, a low profile is maintained and a back focus is secured.

The object-side surface of the sixth lens L6 is the aspheric surface having at least one pole point in a position off the optical axis X. Therefore, the astigmatism, the field curvature, and the distortion are more properly corrected.

The image-side surface of the sixth lens L6 is the aspheric surface having at least one pole point in a position off the optical axis X. Therefore, the astigmatism, the field curvature, and the distortion are more properly corrected.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are properly corrected. Furthermore, in comparison with the case in which a cemented lens is used, workload is reduced, and manufacturing in low cost can be realized.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effects by satisfying the following conditional expressions (1) to (24), $$0.30 < r3/f < 4.00 \tag{1}$$

$$1.80 < r11/(T5+D6) < 9.00 \tag{2}$$

$$11.00 < r3/(T2/T1) \tag{3}$$

$$10.00 < vd2 < 40.00 \tag{4}$$

$$0.10 < (T5/TTL) \times 100 < 3.00 \tag{5}$$

$$-29.00 < r1/(D1+T1) < -4.10 \tag{6}$$

$$r10/T5 < -6.25 \tag{7}$$

$$16.00 < r11/T5 < 200.00 \tag{8}$$

$$10.00 < vd6 < 40.00 \tag{9}$$

$$1.90 < T4/T5 < 20.00 \tag{10}$$

$$-3.65 < (T5/f6) \times 100 < -0.50 \tag{11}$$

$$-0.60 < f1/f2 < -0.05 \tag{12}$$

$$2.20 < f2/f < 14.50 \tag{13}$$

$$-10.00 < f6/D6 < -1.00 \tag{14}$$

$$0.45 < f6/f1 < 1.50 \tag{15}$$

$$-15.50 < r1/f < -2.00 \tag{16}$$

$$-1.55 < r2/r1/D1 < -0.15 \tag{17}$$

$$20.00 < r4/(T2/T1) < 200.00 \tag{18}$$

$$-1.75 < r6/r11 < -0.30 \tag{19}$$

$$2.00 < |r9|/f < 150.00 \tag{20}$$

$$-1.00 < r10/f < -0.10 \tag{21}$$

$$0.80 < r11/f < 2.50 \tag{22}$$

$$-2.50 < r11/f6 < -0.45 \tag{23}$$

$$1.85 < r11/r12 < 6.00 \tag{24}$$

where
vd2: an abbe number at d-ray of the second lens L2,
vd6: an abbe number at d-ray of the sixth lens L6,
D1: a thickness along the optical axis X of the first lens L1,
D6: a thickness along the optical axis X of the sixth lens L6,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T4: a distance along the optical axis X from an image-side surface of the fourth lens L4 to an object-side surface of the fifth lens L5,
T5: a distance along the optical axis X from an image-side surface of the fifth lens L5 to an object-side surface of the sixth lens L6,
f: a focal length of the overall optical system of the imaging lens,
TTL: a total track length,
f1: a focal length of the first lens L1,
f2: a focal length of the second lens L2,
f6: a focal length of the sixth lens L6,
r1: a paraxial curvature radius of an object-side surface of the first lens L1,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r6: a paraxial curvature radius of an image-side surface of the third lens L3,
r9: a paraxial curvature radius of an object-side surface of the fifth lens L5,
r10: a paraxial curvature radius of an image-side surface of the fifth lens L5,
r11: a paraxial curvature radius of an object-side surface of the sixth lens L6, and
r12: a paraxial curvature radius of an image-side surface of the sixth lens L6.

It is not necessary to satisfy the above all conditional expressions. An operational advantage corresponding to each conditional expression can be obtained by satisfying the conditional expression individually.

The imaging lens according to the present embodiments shows further preferable effects by satisfying the following conditional expressions (1a) to (24a), $$0.70 < r3/f < 3.00 \tag{1a}$$

$$2.70 < r11/(T5+D6) < 7.50 \tag{2a}$$

$$16.50 < r3/(T2/T1) < 200.00 \tag{3a}$$

$$15.00 < vd2 < 34.00 \tag{4a}$$

$$0.25 < (T5/TTL) \times 100 < 2.10 \tag{5a}$$

$$-25.00 < r1/(D1+T1) < -5.75 \tag{6a}$$

$$-100.00 < r10/T5 < -10.00 \tag{7a}$$

$$23.00 < r11/T5 < 150.00 \tag{8a}$$

$$15.00 < vd6 < 34.00 \tag{9a}$$

$$2.40 < T4/T5 < 14.50 \tag{10a}$$

$$-3.30 < (T5/f6) \times 100 < -0.80 \tag{11a}$$

$$-0.50 < f1/f2 < -0.10 \tag{12a}$$

$$3.25 < f2/f < 12.00 \tag{13a}$$

$$-8.00 < f6/D6 < -2.00 \tag{14a}$$

$$0.55 < f6/f1 < 1.20 \tag{15a}$$

$$-12.50 < r1/f < -3.00 \tag{16a}$$

$$-1.25 < r2/r1/D1 < -0.25 \tag{17a}$$

$$30.00 < r4/(T2/T1) < 175.00 \tag{18a}$$

$$-1.45 < r6/r11 < -0.50 \tag{19a}$$

$$3.25 < |r9|/f < 110.00 \tag{20a}$$

$$-0.75 < r10/f < -0.25 \tag{21a}$$

$$0.90 < r11/f < 2.00 \tag{22a}$$

$$-2.00 < r11/f6 < -0.60 \tag{23a}$$

$$2.15 < r11/r12 < 4.25. \tag{24a}$$

The signs in the above conditional expressions have the same meanings as those in the paragraph before the preceding paragraph. Additionally, only lower limits or upper limits of the conditional expressions (1a) to (24a) may be applied to the corresponding conditional expressions (1) to (24), respectively.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16} + A_{18}H^{18} + A_{20}H^{20}$$

[Equation 1]

Next, examples of the imaging lens according to this embodiment will be explained. In each example, f denotes a focal length of the overall optical system of the imaging lens, Fno denotes a F-number, ω denotes a half field of view, ih denotes a maximum image height, and TTL denotes a total track length. Additionally, i denotes a surface number counted from the object side, r denotes a paraxial curvature radius, d denotes a distance between lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1

Unit mm f = 1.76
Fno = 2.20
ω(°) = 60.4
ih = 2.93
TTL = 5.62

Surface Data

| i | r | d | Nd | vd | |
|---|---|---|---|---|---|
| (Object) | Infinity | Infinity | | | |
| 1* | −7.4460 | 0.2925 | 1.535 | 55.69 | (vd1) |
| 2* | 1.6835 | 0.7036 | | | |
| 3* | 2.7647 | 0.8386 | 1.639 | 23.52 | (vd2) |
| 4* | 4.2450 | 0.1136 | | | |
| 5 (Stop) | Infinity | −0.0417 | | | |
| 6* | 2.0163 | 0.6187 | 1.544 | 55.93 | (vd3) |
| 7* | −1.4565 | 0.0250 | | | |
| 8* | 3.6197 | 0.2300 | 1.671 | 19.24 | (vd4) |
| 9* | 1.6579 | 0.4015 | | | |
| 10* | −7.7279 | 0.8596 | 1.535 | 55.69 | (vd5) |
| 11* | −0.9277 | 0.0702 | | | |
| 12* | 2.1689 | 0.3969 | 1.639 | 23.52 | (vd6) |
| 13* | 0.8319 | 0.5000 | | | |
| 14 | Infinity | 0.2100 | 1.517 | 64.20 | |
| 15 | Infinity | 0.4727 | | | |
| Image Plane | | | | | |

Constituent Lens Data

| Lens | Start Surface | Focal Length | TTL to diagonal length of effective image area |
|---|---|---|---|
| 1 | 1 | −2.539 | 0.96 |
| 2 | 3 | 10.159 | |
| 3 | 6 | 1.658 | |
| 4 | 8 | 4.786 | |
| 5 | 10 | 1.888 | |
| 6 | 12 | −2.388 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −6.007174E−02 | −2.599788E+00 | −1.182395E+00 | 0.000000E+00 | 1.402379E+00 |
| A4 | 3.223833E−01 | 3.565826E−01 | 4.487057E−02 | 4.846601E−02 | −8.044632E−02 | 1.209772E−01 |
| A6 | −3.206195E−01 | 1.442412E−01 | −9.452929E−02 | −5.502470E−01 | 1.729280E+00 | −1.127872E+00 |
| A8 | 2.347563E−01 | −1.088488E+00 | 2.942448E−01 | 5.193462E+00 | −3.466806E+01 | 6.001119E+00 |
| A10 | −1.143149E−01 | 2.060311E+00 | −6.895160E−01 | −2.788894E+01 | 3.742279E+02 | −1.737252E+01 |
| A12 | 3.453898E−02 | −1.865529E+00 | 7.874045E−01 | 9.204941E+01 | −2.464357E+03 | −9.981308E−01 |

TABLE 1-continued

Example 1

| | | | | | | |
|---|---|---|---|---|---|---|
| A14 | −5.840750E−03 | 8.439413E−01 | 4.016761E−01 | −1.570006E+02 | 1.005038E+04 | 1.516347E+02 |
| A16 | 4.201039E−04 | −1.709322E−01 | 6.933134E−02 | 1.097172E+02 | −2.471355E+04 | 4.267232E+02 |
| A18 | 0.000000E+00 | 0.000000E+00 | 0.000000E+00 | 0.000000E+00 | 3.350262E+04 | 5.081360E+02 |
| A20 | 0.000000E+00 | 0.000000E+00 | 0.000000E+00 | 0.000000E+00 | −1.921038E+04 | −2.305095E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −3.792871E+00 | −1.178166E−02 | −5.110882E+00 |
| A4 | −2.858653E−01 | −2.981153E−01 | 1.400133E−02 | 4.389746E−02 | −2.445542E−01 | −1.215481E−01 |
| A6 | −3.839622E−01 | 1.745798E−01 | −1.120747E−01 | −5.741809E−01 | −1.167332E−01 | 1.357385E−03 |
| A8 | 2.831462E+00 | 2.468627E−01 | 4.143185E−02 | 1.292214E+00 | 2.901445E−01 | 5.323672E−02 |
| A10 | −1.192656E+01 | −5.663011E−01 | 8.432991E−01 | −1.758447E+00 | −2.032656E−01 | 4.298323E−02 |
| A12 | 2.569175E+01 | −2.466145E+00 | −1.920397E+00 | 1.701078E+00 | 7.222105E−02 | 1.843897E−02 |
| A14 | −2.826617E+01 | 1.131870E+01 | 2.508508E+00 | −1.091007E+00 | −1.310167E−02 | −4.892443E−03 |
| A16 | 1.258441E+01 | −1.815984E+01 | −2.172640E+00 | 4.263089E−01 | 8.128481E−04 | 7.963570E−04 |
| A18 | 0.000000E+00 | 1.345480E+01 | 1.125385E+00 | −9.121272E−02 | 7.597382E−05 | −7.236852E−05 |
| A20 | 0.000000E+00 | −3.869520E+00 | −2.568825E−01 | 8.174767E−03 | −1.015998E−05 | 2.793490E−06 |

The imaging lens in Example 1 achieves a ratio of a total track length to a diagonal length of an effective image area of the image sensor of 0.96, and a F number of 2.20. As shown in Table 13, the imaging lens in Example 1 satisfies the conditional expressions (1) to (24).

Figure 2:
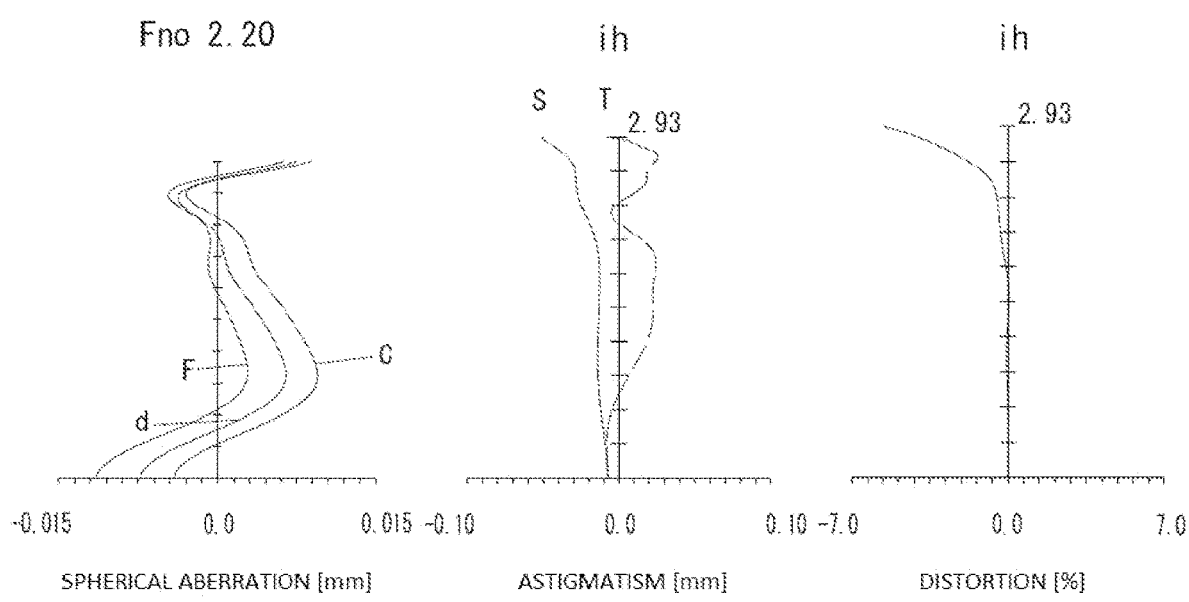
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4, 6, 8, 10, 12, 14, 16, 18, 20, 22 and 24). As shown in FIG. 2, each aberration is corrected excellently.

Example 2

The basic lens data is shown below in Table 2.

TABLE 2

Example 2

Unit mm $f = 1.76$
$Fno = 2.20$
$\omega(°) = 60.4$
$h = 2.93$
$TTL = 5.82$

Surface Data

| i | r | d | Nd | vd | |
|---|---|---|---|---|---|
| (Object) | Infinity | Infinity | | | |
| 1* | −9.8711 | 0.2459 | 1.535 | 55.69 | (vd1) |
| 2* | 1.5405 | 0.6702 | | | |
| 3* | 3.2538 | 1.0195 | 1.671 | 19.24 | (vd2) |
| 4* | 4.0816 | 0.1212 | | | |
| 5 (Stop) | Infinity | −0.0842 | | | |
| 6* | 1.3879 | 0.6662 | 1.544 | 55.93 | (vd3) |
| 7* | −2.5908 | 0.2016 | | | |
| 8* | −3.7814 | 0.3063 | 1.671 | 19.24 | (vd4) |
| 9* | −153.2972 | 0.2083 | | | |
| 10* | 16.6503 | 0.8020 | 1.535 | 55.69 | (vd5) |
| 11* | −1.0035 | 0.0250 | | | |
| 12* | 2.8485 | 0.5309 | 1.588 | 28.30 | (vd6) |
| 13* | 0.8634 | 0.5000 | | | |
| 14 | Infinity | 0.2100 | 1.517 | 64.20 | |
| 15 | Infinity | 0.4682 | | | |
| Image Plane | | | | | |

Constituent Lens Data

| Lens | Start Surface | Focal Length | TTL to diagonal length of effective image area |
|---|---|---|---|
| 1 | 1 | −2.473 | 0.99 |
| 2 | 3 | 16.004 | |
| 3 | 6 | 1.765 | |
| 4 | 8 | −5.785 | |

TABLE 2-continued

| Example 2 | | | |
|---|---|---|---|
| 5 | 10 | 1.798 | |
| 6 | 12 | −2.338 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −4.540924E−01 | 6.501817E−02 | −8.423707E−01 | 0.000000E+00 | 6.180574E+00 |
| A4 | 3.836419E−01 | 4.455059E−01 | −3.334881E−02 | −3.331287E−01 | 4.703277E−01 | −1.705764E−01 |
| A6 | −5.243904E−01 | 1.426069E−02 | 8.162935E−02 | 1.726169E+00 | 2.715762E+00 | −1.881307E+00 |
| A8 | 5.403731E−01 | −2.008404E+00 | −4.015078E−01 | −6.276987E+00 | −1.779499E+01 | 1.856656E+01 |
| A10 | −4.078425E−01 | 6.926303E+00 | 1.063677E+00 | 9.862725E+00 | 1.055934E+02 | −1.125403E+02 |
| A12 | 2.165231E−01 | −1.338055E+01 | −1.758792E+00 | 6.749770E+01 | −5.261350E+02 | 4.291403E+02 |
| A14 | −7.798106E−02 | 1.612902E+01 | 1.794902E+00 | −5.178582E+02 | 1.938562E+03 | −1.041415E+03 |
| A16 | 1.800709E−02 | −1.192987E+01 | −1.141756E+00 | 1.590077E+03 | 4.685155E+03 | 1.560129E+03 |
| A18 | −2.391517E−03 | 4.870900E+00 | 4.366367E−01 | −2.373307E+03 | 6.450876E+03 | −1.311478E+03 |
| A20 | 1.383526E−04 | −8.290080E−01 | −7.780008E−02 | 1.402773E+03 | −3.801041E+03 | 4.693410E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −5.955227E+00 | −1.065582E+00 | −6.361658E+00 |
| A4 | −4.620560E−01 | −1.483694E−01 | 2.111262E−01 | 3.913779E−02 | −1.400660E−01 | −6.873786E−02 |
| A6 | −1.394984E+00 | −1.108503E+00 | −7.891615E−01 | −5.967785E−02 | −1.302611E−01 | −3.169556E−02 |
| A8 | 1.251811E+01 | 6.184144E+00 | 1.491861E+00 | −1.711966E+00 | 7.496950E−02 | 5.072226E−02 |
| A10 | −6.460846E+01 | −1.795098E+01 | −1.798489E+00 | 4.867243E−01 | 1.161112E−01 | −2.935131E−02 |
| A12 | 2.257495E+02 | 3.609194E+01 | 1.542213E+00 | −4.639011E−01 | −1.510997E−01 | 1.010102E−02 |
| A14 | −5.093573E+02 | −4.795962E+01 | −9.622920E−01 | 2.224068E−01 | 7.324372E−02 | −2.287121E−03 |
| A16 | 7.089120E+02 | 3.952148E+01 | 4.102263E−01 | −5.695332E−02 | −1.791367E−02 | 3.337143E−04 |
| A18 | −5.525420E+02 | −1.812066E+01 | −1.046847E−01 | 7.120765E−03 | 2.204128E−03 | −2.818524E−05 |
| A20 | 1.804328E+02 | 3.495157E+00 | 1.186908E−02 | −3.042986E−04 | −1.086037E−04 | 1.034201E−06 |

The imaging lens in Example 2 achieves a ratio of a total track length to a diagonal length of an effective image area of the image sensor of 0.99, and a F number of 2.20. As shown in Table 13, the imaging lens in Example 2 satisfies the conditional expressions (1) to (24).

Figure 4:
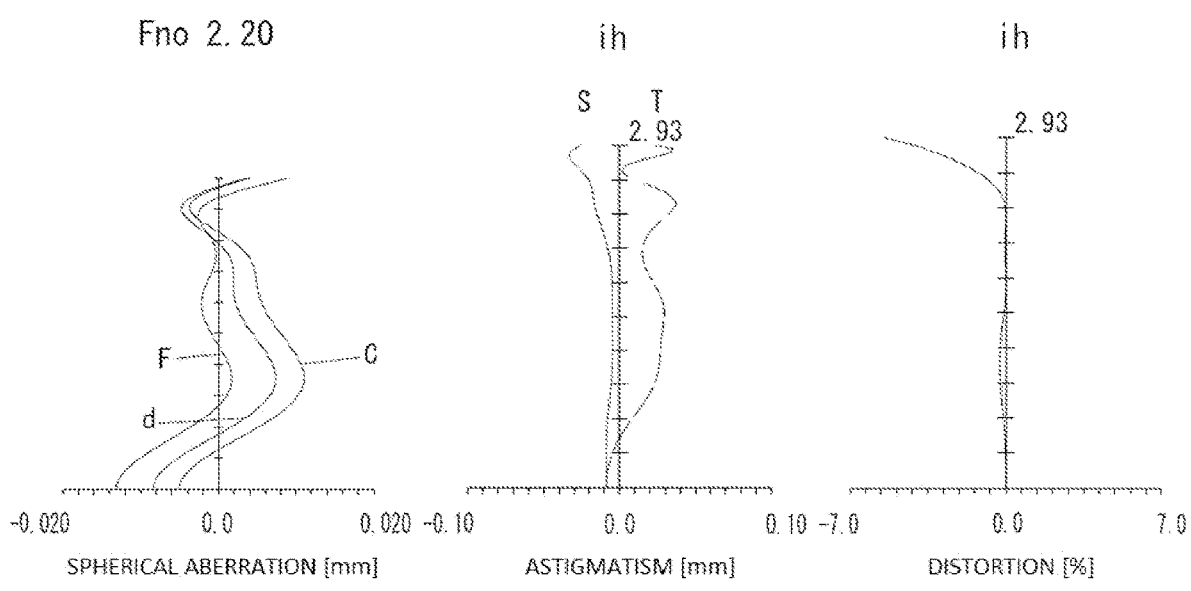
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| Example 3 |
|---|
| Unit mm | f = 1.76
Fno = 2.20
ω(°) = 60.3
h = 2.93
TTL = 5.83

Surface Data

| i | r | d | Nd | vd | |
|---|---|---|---|---|---|
| (Object) | Infinity | Infinity | | | |
| 1* | −11.1142 | 0.2466 | 1.535 | 55.69 | (vd1) |
| 2* | 1.4949 | 0.6998 | | | |
| 3* | 3.1216 | 0.9471 | 1.671 | 19.24 | (vd2) |
| 4* | 3.7964 | 0.1153 | | | |
| 5 (Stop) | Infinity | −0.0733 | | | |
| 6* | 1.4064 | 0.6885 | 1.544 | 55.93 | (vd3) |
| 7* | −2.5764 | 0.1777 | | | |
| 8* | −3.5558 | 0.3077 | 1.671 | 19.24 | (vd4) |
| 9* | −29.2525 | 0.2296 | | | |
| 10* | 17.6882 | 0.7907 | 1.535 | 55.69 | (vd5) |
| 11* | −0.9961 | 0.0252 | | | |
| 12* | 2.8496 | 0.5243 | 1.588 | 28.30 | (vd6) |
| 13* | 0.8623 | 0.5000 | | | |

TABLE 3-continued

Example 3

| | | | |
|---|---|---|---|
| 14 | Infinity | 0.2100 | 1.517 |
| 15 | Infinity | 0.5110 | |
| Image Plane | | | |

Constituent Lens Data

| Lens | Start Surface | Focal Length | TTL to diagonal length of effective image area |
|---|---|---|---|
| 1 | 1 | −2.447 | 0.99 |
| 2 | 3 | 16.748 | |
| 3 | 6 | 1.780 | |
| 4 | 8 | −6.064 | |
| 5 | 10 | 1.790 | |
| 6 | 12 | −2.330 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −3.903800E−01 | 1.914655E−02 | −3.580132E+00 | 0.000000E+00 | 6.458352E+00 |
| A4 | 3.862843E−01 | 4.161432E−01 | −1.382517E−02 | −2.519280E−01 | −5.545046E−01 | −1.328493E−01 |
| A6 | −5.255263E−01 | 3.236684E−01 | −7.016574E−02 | −3.326427E−01 | 5.290177E+00 | −2.865699E+00 |
| A8 | 5.360148E−01 | −3.467186E+00 | 2.399320E−01 | 2.474236E+01 | −5.137241E+01 | 2.879848E+01 |
| A10 | −4.012814E−01 | 1.107973E+01 | −6.746262E−01 | −2.716037E+02 | 3.497054E+02 | −1.739370E+02 |
| A12 | 2.122304E−01 | −2.087304E+01 | 1.304496E+00 | 1.629294E+03 | −1.582687E+03 | 6.555371E+02 |
| A14 | −7.636859E−02 | 2.463281E+01 | −1.665385E+00 | −5.875017E+03 | 4.643502E+03 | −1.561103E+03 |
| A16 | 1.764430E−02 | −1.773970E+01 | 1.256374E+00 | 1.267406E+04 | −8.488464E+03 | 2.283060E+03 |
| A18 | −2.346439E−03 | 7.034341E+00 | 4.844269E−01 | −1.505906E+04 | 8.782046E+03 | −1.867856E+03 |
| A20 | 1.360172E−04 | −1.164332E+00 | 7.142852E−02 | 7.576033E+03 | −3.938822E+03 | 6.506111E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −5.959192E+00 | −1.037301E+00 | −6.518730E+00 |
| A4 | 4.560522E−01 | −1.529443E−01 | 1.960329E−01 | 6.689063E−03 | −1.541849E−01 | −6.383677E−02 |
| A6 | −1.540288E+00 | −1.062477E+00 | −7.301762E−01 | 7.921442E−02 | −5.995709E−02 | −3.372175E−02 |
| A8 | 1.284500E+01 | 6.028848E+00 | 1.376193E+00 | 4.919760E−01 | −3.042295E−02 | 5.460313E−02 |
| A10 | −6.273106E+01 | −1.770676E+01 | −1.716959E+00 | 9.253313E−01 | 2.049934E−01 | −3.315933E−02 |
| A12 | 2.114205E+02 | 3.580349E+01 | 1.590073E+00 | −8.402772E−01 | −1.965212E−01 | 1.207600E−02 |
| A14 | −4.690993E+02 | 4.756860E+01 | −1.089523E+00 | 4.264196E−01 | 8.727379E−02 | −2.869418E−03 |
| A16 | 6.517231E+02 | 3.904017E+01 | 5.049301E−01 | −1.243629E−01 | −2.045566E−02 | 4.322733E−04 |
| A18 | −5.115859E+02 | −1.775805E+01 | −1.373938E−01 | 1.944789E−02 | 2.452048E−03 | −3.706347E−05 |
| A20 | 1.716038E+02 | 3.399693E+00 | 1.631472E−02 | −1.256404E−03 | −1.186368E−04 | 1.362233E−06 |

The imaging lens in Example 3 achieves a ratio of a total track length to a diagonal length of an effective image area of the image sensor of 0.99, and a F number of 2.20. As shown in Table 13, the imaging lens in Example 3 satisfies the conditional expressions (1) to (24).

Figure 6:
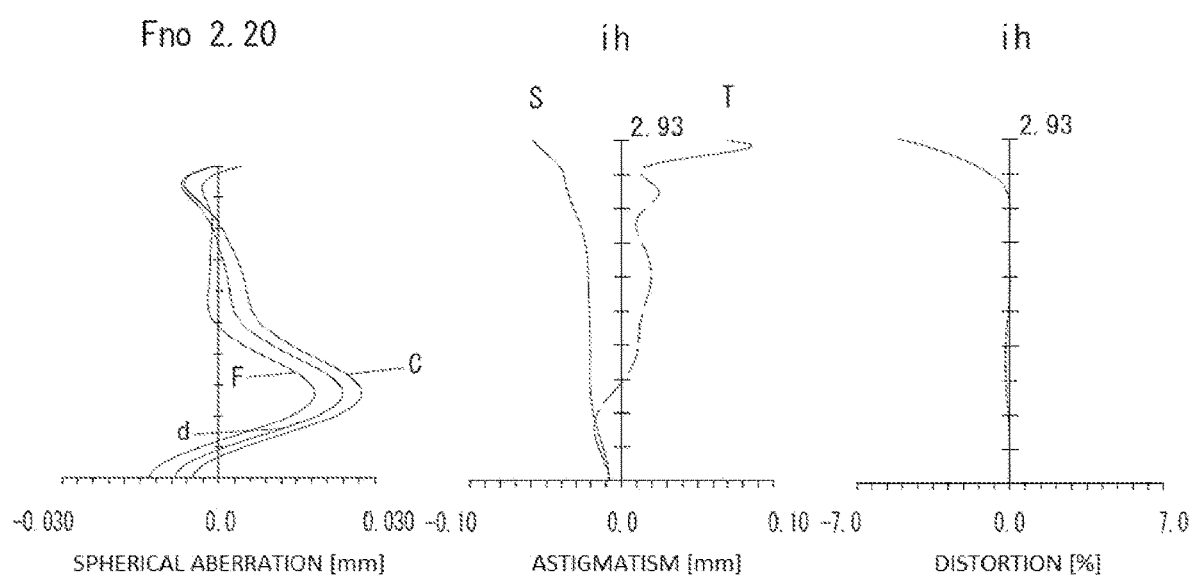
FIG. 6 shows spherical aberration, astigmatism, and distortion of the imaging lens in Example 3 according to the present invention.
Figure 7:
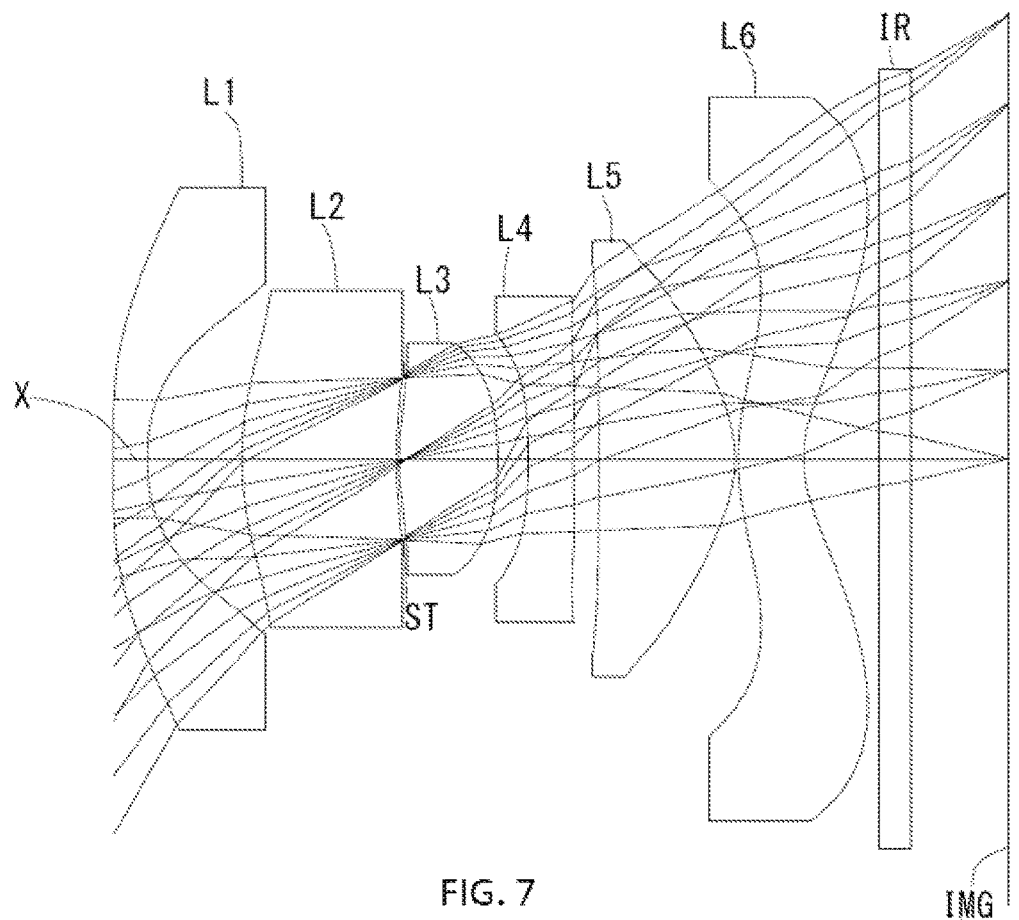
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm f = 1.76
Fno = 2.20
ω(°) = 60.3
h = 2.93
TTL = 5.83

TABLE 4-continued

Example 4

Surface Data

| i | r | d | Nd | νd | |
|---|---|---|---|---|---|
| (Object) | Infinity | Infinity | | | |
| 1* | −16.7117 | 0.2205 | 1.535 | 55.69 | (vd1) |
| 2* | 1.4160 | 0.6253 | | | |
| 3* | 2.2322 | 1.0184 | 1.588 | 28.30 | (vd2) |
| 4* | 2.6662 | 0.0411 | | | |
| 5 (Stop) | Infinity | −0.0260 | | | |
| 6* | 1.7610 | 0.6497 | 1.544 | 55.93 | (vd3) |
| 7* | −2.1782 | 0.1973 | | | |
| 8* | −10.3163 | 0.3068 | 1.671 | 19.24 | (vd4) |
| 9* | 7.5262 | 0.1633 | | | |
| 10* | −39.1805 | 0.8960 | 1.535 | 55.69 | (vd5) |
| 11* | −0.8539 | 0.0251 | | | |
| 12* | 1.8514 | 0.4269 | 1.614 | 25.59 | (vd6) |
| 13* | 0.7435 | 0.5000 | | | |
| 14 | Infinity | 0.2100 | 1.517 | 64.20 | |
| 15 | Infinity | 0.6454 | | | |
| Image Plane | | | | | |

Constituent Lens Data

| Lens | Start Surface | Focal Length | TTL to diagonal length of effective image area |
|---|---|---|---|
| 1 | 1 | −2.431 | 0.99 |
| 2 | 3 | 12.477 | |
| 3 | 6 | 1.899 | |
| 4 | 8 | −6.443 | |
| 5 | 10 | 1.619 | |
| 6 | 12 | −2.370 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −6.579027E−01 | −1.898872E+00 | −1.421183E+01 | 7.693244E−02 | 5.867001E+00 |
| A4 | 3.680399E−01 | 4.180624E−01 | −2.220929E−02 | −6.932203E−01 | −9.804485E−01 | −2.195844E−01 |
| A6 | 4.865347E−01 | 7.896708E−02 | 3.603171E−02 | 5.126491E+00 | 8.117346E+00 | −7.562052E−01 |
| A8 | 4.582503E−01 | −1.808592E+00 | −1.391344E−01 | −3.739921E+01 | −8.505083E+01 | 7.521648E+00 |
| A10 | −3.073992E−01 | 5.202307E+00 | −2.952799E−02 | 2.418418E+02 | 6.898012E+02 | 4.408462E+01 |
| A12 | 1.446585E−01 | −8.923598E+00 | 6.678270E−01 | −1.136398E+03 | −3.790976E+03 | 1.593637E+02 |
| A14 | 4.652486E−02 | 1.004662E+01 | −1.361959E+00 | 3.574290E+03 | 1.343157E+04 | −3.636805E+02 |
| A16 | 9.697174E−03 | −7.161419E+00 | 1.266763E+00 | −7.013893E+03 | −2.922572E+04 | 5.120091E+02 |
| A18 | −1.174419E−03 | 2.838268E+00 | −5.602757E−01 | 7.742787E+03 | 3.530822E+04 | 4.080126E+02 |
| A20 | 6.245988E−05 | −4.649382E−01 | 9.536715E−02 | −3.667534E+03 | −1.801173E+04 | 1.430262E+02 |

| | 8th Surface | 9th Surface | 10th Surface | 11th Surface | 12th Surface | 13th Surface |
|---|---|---|---|---|---|---|
| k | 3.163064E+01 | −1.980615E−01 | −1.150678E+03 | −5.045004E+00 | −1.394871E+00 | −5.210385E+00 |
| A4 | −5.627631E−01 | −2.315475E−01 | 5.986873E−02 | −1.145622E−01 | −1.140181E−01 | 1.100350E−02 |
| A6 | 1.511854E+00 | 1.035324E−01 | −1.496443E−01 | 1.838095E−01 | −2.965272E−02 | −9.292783E−02 |
| A8 | −1.219329E+01 | 1.089667E−01 | −7.611663E−03 | −3.829868E−01 | 1.459621E−02 | 8.277672E−02 |
| A10 | 6.383561E+01 | 2.506465E−01 | 6.378304E−01 | 5.326250E−01 | 3.366621E−02 | 4.055280E−02 |
| A12 | −2.078907E+02 | −1.330509E+00 | −1.364225E+00 | 4.019718E−01 | −3.548781E−02 | 1.235691E−02 |
| A14 | 4.281698E+02 | 2.621218E+00 | 1.411672E+00 | 1.474416E−01 | 1.471972E−02 | −2.414735E−03 |
| A16 | −5.384764E+02 | −2.759539E+00 | −8.021030E−01 | −1.768145E−02 | −3.110194E−03 | 2.950571E−04 |
| A18 | 3.746621E+02 | 1.477152E+00 | 2.403998E−01 | −2.671401E−03 | 3.327960E−04 | −2.054818E−05 |
| A20 | −1.100083E+02 | −3.140737E−01 | −2.978510E−02 | 6.194768E−04 | −1.435770E−05 | 6.216630E−07 |

The imaging lens in Example 4 achieves a ratio of a total track length to a diagonal length of an effective image area of the image sensor of 0.99, and a F number of 2.20. As shown in Table 13, the imaging lens in Example 4 satisfies the conditional expressions (1) to (24).

Figure 8:
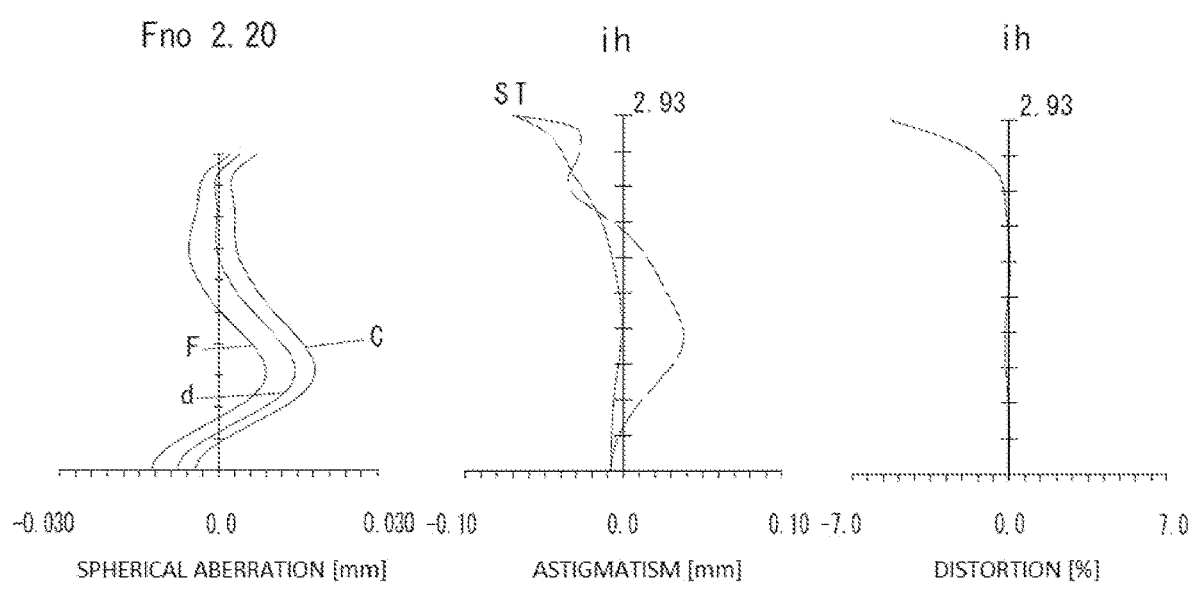
FIG. 8 shows spherical aberration, astigmatism, and distortion of the imaging lens in Example 4 according to the present invention.
Figure 9:
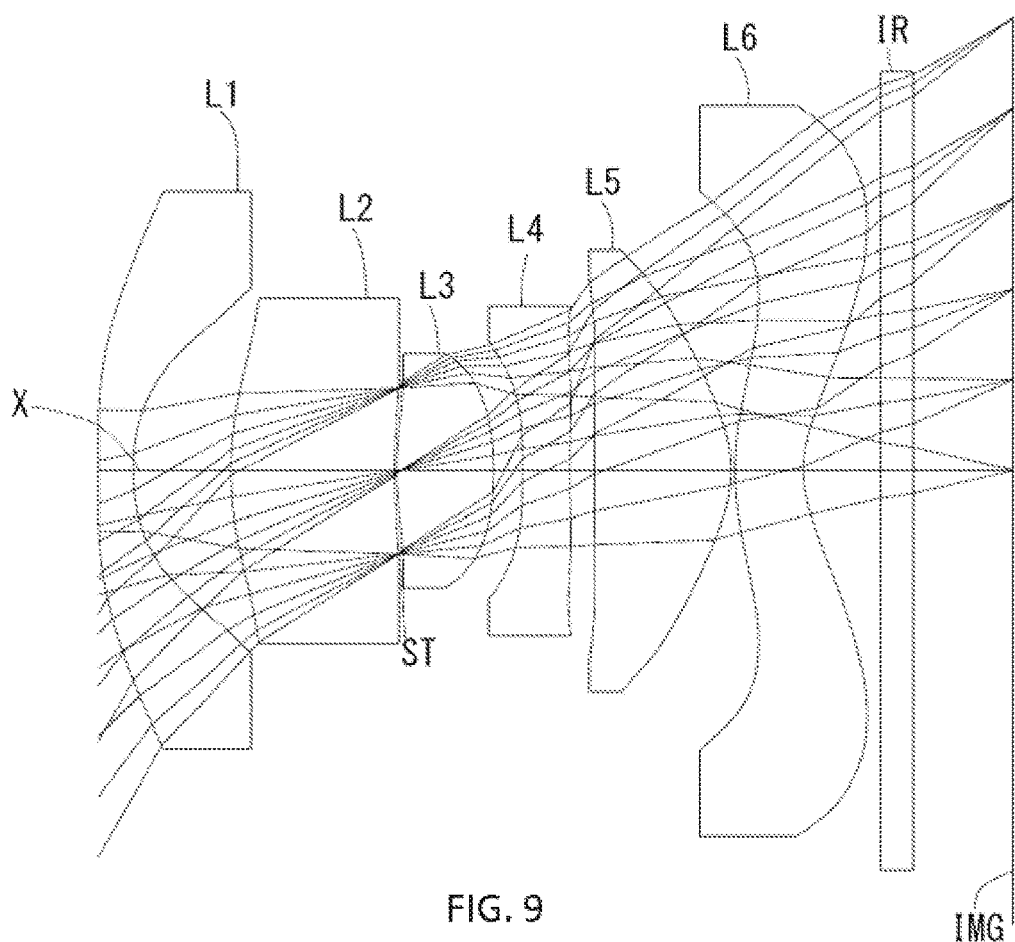
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm f = 1.76
Fno = 2.20
ω(°) = 60.4
h = 2.93
TTL = 5.83

Surface Data

| i | r | d | Nd | vd | |
|---|---|---|---|---|---|
| (Object) | Infinity | Infinity | | | |
| 1* | −12.7796 | 0.2244 | 1.535 | 55.69 | (vd1) |
| 2* | 1.4897 | 0.6276 | | | |
| 3* | 2.2543 | 1.0606 | 1.588 | 28.36 | (vd2) |
| 4* | 3.3377 | 0.0271 | | | |
| 5 (Stop) | Infinity | −0.0131 | | | |
| 6* | 2.0521 | 0.6218 | 1.544 | 55.93 | (vd3) |
| 7* | −2.0428 | 0.1886 | | | |
| 8* | −7.9314 | 0.3079 | 1.671 | 19.24 | (vd4) |
| 9* | 6.4865 | 0.1548 | | | |
| 10* | 43.2363 | 0.8820 | 1.535 | 55.69 | (vd5) |
| 11* | −0.8492 | 0.0251 | | | |
| 12* | 1.8582 | 0.4416 | 1.614 | 25.59 | (vd6) |
| 13* | 0.7477 | 0.5000 | | | |
| 14 | Infinity | 0.2100 | 1.517 | 64.20 | |
| 15 | Infinity | 0.6405 | | | |
| Image Plane | | | | | |

Constituent Lens Data

| Lens | Start Surface | Focal Length | TTL to diagonal length of effective image area |
|---|---|---|---|
| 1 | 1 | −2.481 | 0.99 |
| 2 | 3 | 8.677 | |
| 3 | 6 | 1.987 | |
| 4 | 8 | −5.275 | |
| 5 | 10 | 1.608 | |
| 6 | 12 | −2.400 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −7.355653E−01 | −2.008683E+00 | −9.150921E+00 | 0.000000E+00 | 5.586748E+00 |
| A4 | 3.876834E−01 | 4.387918E−01 | 8.631980E−03 | −7.073111E−01 | −9.926954E−01 | −2.904156E−01 |
| A6 | −5.493722E−01 | 7.766271E−02 | −2.395755E−01 | 5.968992E+00 | 1.031347E+01 | −2.534776E−01 |
| A8 | 5.592276E−01 | −2.389610E+00 | 1.099395E+00 | −5.536745E+01 | −1.282000E+02 | 4.427903E+00 |
| A10 | 4.026172E−01 | 7.360877E+00 | −3.457632E+00 | 4.247136E+02 | 1.131581E+03 | −3.241165E+01 |
| A12 | 2.009652E−01 | −1.269516E+01 | 6.679887E+00 | −2.278437E+03 | −6.552151E+03 | 1.384693E+02 |
| A14 | −6.765942E−02 | 1.372695E+01 | −8.039562E+00 | 8.098365E+03 | 2.415604E+04 | −3.630394E+02 |
| A16 | 1.457424E−02 | −9.217333E+00 | 5.791081E+00 | −1.794251E+04 | −5.429344E+04 | 5.769449E+02 |
| A18 | −1.803858E−03 | 3.460876E+00 | −2.254486E+00 | 2.228129E+04 | 6.733812E+04 | −5.121324E+02 |
| A20 | 9.717000E−05 | −5.461674E−01 | 3.627527E−01 | −1.175817E+04 | −3.506212E+04 | 1.931081E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −4.739044E+00 | −1.560477E+00 | −5.322485E+00 |
| A4 | −5.989241E−01 | −2.462431E−01 | 7.295926E−02 | −1.070493E−01 | −1.413428E−01 | −1.549120E−03 |
| A6 | 8.401142E−01 | 2.401959E−02 | 5.923155E−02 | 2.267526E−01 | 9.092825E−02 | −5.958870E−02 |
| A8 | −5.660613E+00 | 6.460068E−01 | −9.458158E−01 | −3.416704E−01 | −1.547431E−01 | 4.714468E−02 |

TABLE 5-continued

| | | | Example 5 | | | |
|---|---|---|---|---|---|---|
| A10 | 3.205997E+01 | −1.430830E+00 | 2.714764E+00 | 3.104874E−01 | 1.634915E−01 | −1.973806E−02 |
| A12 | −1.111947E+02 | 1.917321E+00 | 4.225633E+00 | −1.134380E−01 | −9.675111E−02 | 4.901337E−03 |
| A14 | 2.470261E+02 | −1.173644E+00 | 3.912114E+00 | −5.267505E−02 | 3.263947E−02 | −7.412109E−04 |
| A16 | −3.372994E+02 | −2.044129E−01 | −2.139451E+00 | 6.247486E−02 | −6.247858E−03 | 6.622141E−05 |
| A18 | 2.531184E+02 | 5.775236E−01 | 6.384979E−01 | −1.993668E−02 | 6.328233E−04 | −3.216783E−06 |
| A20 | −7.919644E+01 | −1.858258E−01 | −8.020682E−02 | 2.153682E−03 | −2.638405E−05 | 6.740271E−08 |

The imaging lens in Example 5 achieves a ratio of a total track length to a diagonal length of an effective image area of the image sensor of 0.99, and a F number of 2.20. As shown in Table 13, the imaging lens in Example 5 satisfies the conditional expressions (1) to (24).

Figure 10:
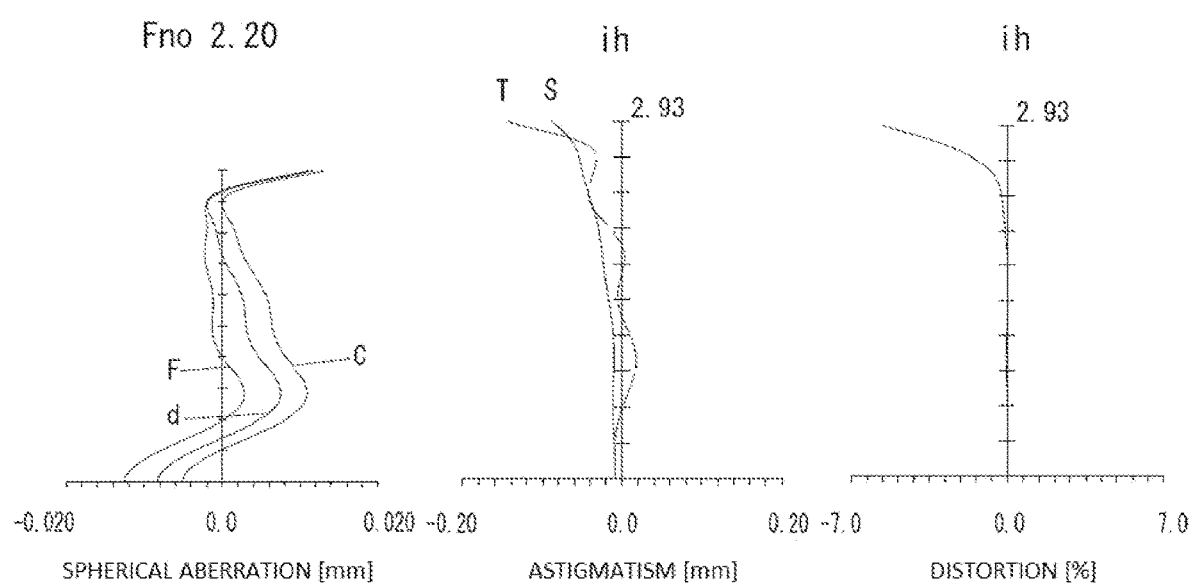
FIG. 10 shows spherical aberration, astigmatism, and distortion of the imaging lens in Example 5 according to the present invention.
Figure 11:
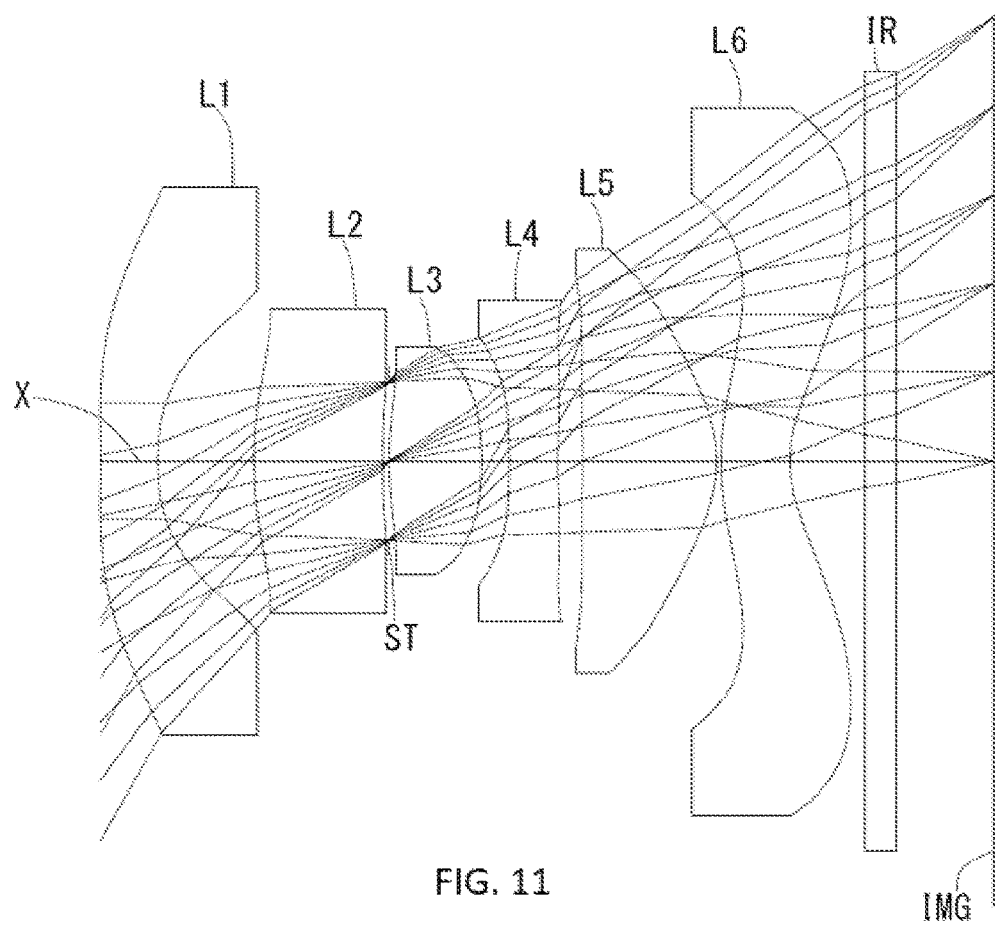
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

| Example 6 |
|---|
| Unit mm |
| f = 1.76 |
| Fno = 2.20 |
| ω(°) = 60.4 |
| h = 2.93 |
| TTL = 5.83 |

Surface Data

| i | r | d | Nd | vd | |
|---|---|---|---|---|---|
| (Object) | Infinity | Infinity | | | |
| 1* | −11.0687 | 0.3772 | 1.535 | 55.69 | (vd1) |
| 2* | 1.6240 | 0.6350 | | | |
| 3* | 2.6520 | 0.8534 | 1.614 | 25.59 | (vd2) |
| 4* | 4.5408 | 0.0398 | | | |
| 5 (Stop) | Infinity | 0.0022 | | | |
| 6* | 2.3411 | 0.6086 | 1.544 | 55.93 | (vd3) |
| 7* | −2.0800 | 0.1818 | | | |
| 8* | −10.2555 | 0.3227 | 1.671 | 19.24 | (vd4) |
| 9* | 5.5701 | 0.1633 | | | |
| 10* | −35.4204 | 0.8887 | 1.535 | 55.69 | (vd5) |
| 11* | −0.8246 | 0.0272 | | | |
| 12* | 1.9282 | 0.4521 | 1.639 | 23.52 | (vd6) |
| 13* | 0.7544 | 0.5000 | | | |
| 14 | Infinity | 0.2100 | 1.517 | 64.20 | |
| 15 | Infinity | 0.6386 | | | |
| Image Plane | | | | | |

Constituent Lens Data

| Lens | Start Surface | Focal Length | TTL to diagonal length of effective image area |
|---|---|---|---|
| 1 | 1 | −2.621 | 0.99 |
| 2 | 3 | 8.857 | |
| 3 | 6 | 2.127 | |
| 4 | 8 | −5.338 | |
| 5 | 10 | 1.565 | |
| 6 | 12 | −2.281 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −7.833034E−01 | −3.282657E+00 | 9.710790E+00 | 0.000000E+00 | 5.746540E+00 |
| A4 | 2.858126E−01 | 4.095902E−01 | 6.978692E−03 | −2.166739E−01 | −3.872278E−01 | −3.052922E−01 |
| A6 | −3.218308E−01 | −7.766193E−02 | −2.330012E−01 | 7.288332E−01 | 3.536369E+00 | −8.488803E−02 |

TABLE 6-continued

| | | | Example 6 | | | |
|---|---|---|---|---|---|---|
| A8 | 2.880475E−01 | −1.143245E+00 | 9.528692E−01 | −1.179320E+01 | −5.319339E+01 | 2.679508E+00 |
| A10 | −1.906151E−01 | 4.139259E+00 | −3.078609E+00 | 1.584860E+02 | 5.027119E+02 | −2.112099E+01 |
| A12 | 8.894571E−02 | −8.090557E+00 | 6.310068E+00 | −1.180113E+03 | −2.993887E+03 | 9.705363E+01 |
| A14 | −2.818636E−02 | 9.933397E+00 | −8.241498E+00 | 5.124015E+03 | 1.111640E+04 | −2.776770E+02 |
| A16 | 5.730363E−03 | −7.623109E+00 | 6.533959E+00 | −1.290979E+04 | −2.486072E+04 | 4.794140E+02 |
| A18 | −6.711933E−04 | 3.246575E+00 | −2.805588E+00 | 1.747929E+04 | 3.037730E+04 | −4.557199E +02 |
| A20 | 3.440781E−05 | −5.725344E−01 | 4.951238E−01 | −9.788889E+03 | −1.543428E+04 | 1.808511E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −4.499806E+00 | −1.591177E+00 | −5.364008E+00 |
| A4 | −6.011040E−01 | −2.823241E−01 | 4.924658E−02 | −1.198078E−01 | −1.533428E−01 | −2.145495E−02 |
| A6 | 1.085463E+00 | 3.867642E−01 | 1.060645E−01 | 2.141299E−01 | 1.122834E−01 | −2.956238E−02 |
| A8 | −7.817767E+00 | −1.143398E+00 | −9.384482E−01 | −1.877875E−01 | −1.505404E−01 | 2.604406E−02 |
| A10 | 4.305321E+01 | 3.932761E+00 | 2.445091E+00 | −1.661284E−01 | 1.383924E−01 | −1.101096E−02 |
| A12 | −1.429041E+02 | −8.013709E+00 | −3.572138E+00 | 2.282701E−01 | −7.636976E−02 | 2.628842E−03 |
| A14 | 2.965559E+02 | 1.010668E+01 | 3.140153E+00 | −2.530719E−01 | 2.464943E−02 | −3.622735E−04 |
| A16 | −3.762232E+02 | −7.834080E+00 | −1.641887E+00 | 1.290314E−01 | −4.563044E−03 | 2.675960E−05 |
| A18 | 2.652387E+02 | 3.395722E+00 | 4.710767E−01 | −3.157182E−02 | 4.497355E−04 | −8.599348E−07 |
| A20 | −7.925426E+01 | −6.426072E−01 | −5.713448E−02 | 2.982541E−03 | −1.833414E−05 | 5.253936E−09 |

The imaging lens in Example 6 achieves a ratio of a total track length to a diagonal length of an effective image area of the image sensor of 0.99, and a F number of 2.20. As shown in Table 13, the imaging lens in Example 6 satisfies the conditional expressions (1) to (24).

Figure 12:
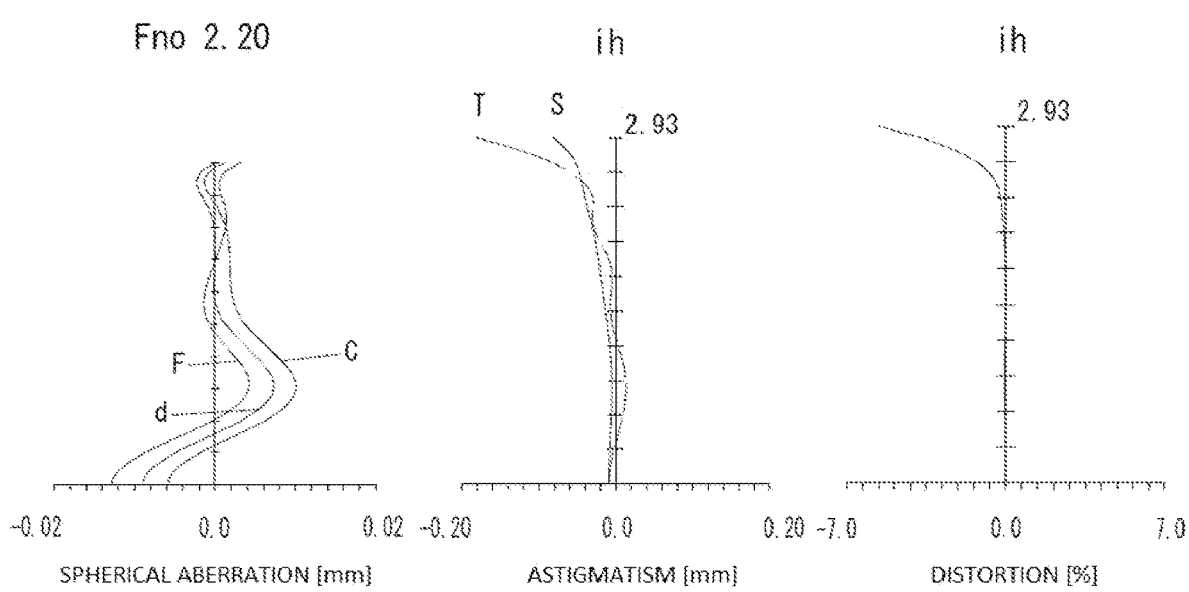
FIG. 12 shows spherical aberration, astigmatism, and distortion of the imaging lens in Example 6 according to the present invention.
Figure 13:
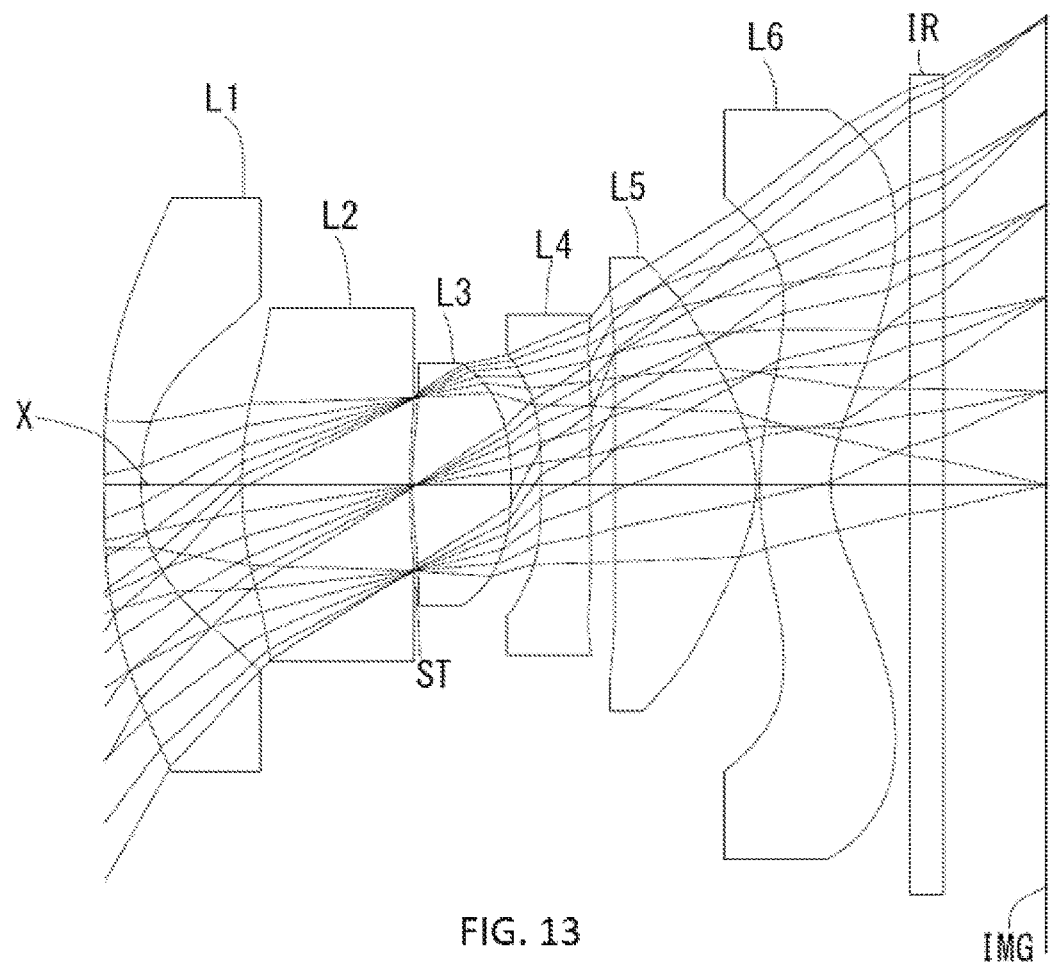
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

| Example 7 |
|---|
| Unit mm | f = 1.76
Fno = 2.20
ω(°) = 60.4
h = 2.93
TTL = 5.83

Surface Date

| i | r | d | Nd | vd | |
|---|---|---|---|---|---|
| (Object) | Infinity | Infinity | | | |
| 1* | −12.8995 | 0.2247 | 1.535 | 55.69 | (vd1) |
| 2* | 1.4734 | 0.6301 | | | |
| 3* | 2.2394 | 1.0558 | 1.588 | 28.36 | (vd2) |
| 4* | 3.3212 | 0.0279 | | | |
| 5 (Stop) | Infinity | −0.0142 | | | |
| 6* | 2.0513 | 0.6196 | 1.544 | 55.93 | (vd3) |
| 7* | −2.0432 | 0.1877 | | | |
| 8* | −8.0506 | 0.3084 | 1.671 | 19.24 | (vd4) |
| 9* | 6.5509 | 0.1546 | | | |
| 10* | −35.6963 | 0.8811 | 1.535 | 55.69 | (vd5) |
| 11* | −0.8470 | 0.0261 | | | |

TABLE 7-continued

| Example 7 | | | | | |
|---|---|---|---|---|---|
| 12* | 1.8745 | 0.4417 | 1.614 | 25.59 | (vd6) |
| 13* | 0.7489 | 0.5000 | | | |
| 14 | Infinity | 0.2100 | 1.517 | 64.20 | |
| 15 Image Plane | Infinity | 0.6478 | | | |

Constituent Lens Data

| Lens | Start Surface | Focal Length | TTL to diagonal length of effective image area |
|---|---|---|---|
| 1 | 1 | −2.459 | 0.99 |
| 2 | 3 | 8.597 | |
| 3 | 6 | 1.987 | |
| 4 | 8 | −5.340 | |
| 5 | 10 | 1.608 | |
| 6 | 12 | −2.387 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −7.241196E−01 | −2.022944E+00 | −8.707937E+00 | 0.000000E+00 | 5.607999E+00 |
| A4 | 3.878414E−01 | 4.478559E−01 | 6.697709E−03 | −7.143790E−01 | −1.011095E+00 | −2.636704E−01 |
| A6 | −5.504767E−01 | −2.194333E−02 | −2.270186E−01 | 6.468020E+00 | 1.090111E+01 | −7.874241E−01 |
| A8 | 5.613334E−01 | −1.920018E+00 | 1.052063E+00 | −6.708790E+01 | −1.395907E+02 | 9.562213E+00 |
| A10 | −4.051668E−01 | 6.159227E+00 | −3.343510E+00 | 5.536874E+02 | 1.249130E+03 | −6.127720E+01 |
| A12 | 2.028618E−01 | −1.086198E+01 | 6.525345E+00 | −3.063071E+03 | −7.243224E+03 | 2.384502E+02 |
| A14 | −6.850720E−02 | 1.201959E+01 | −7.957896E+00 | 1.089619E+04 | 2.655925E+04 | −5.785997E+02 |
| A16 | 1.479785E−02 | −8.267591E+00 | 5.827244E+00 | −2.374974E+04 | −5.917128E+04 | 8.582043E+02 |
| A18 | −1.835953E−03 | 3.171639E+00 | −2.313463E+00 | 2.876336E+04 | 7.266542E+04 | −7.149114E+02 |
| A20 | 9.909790E−05 | −5.091731E−01 | 3.809110E−01 | −1.476027E+04 | −3.747752E+04 | 2.549616E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | 4.688884E+00 | −1.571009E+00 | −5.310471E+00 |
| A4 | −5.919188E−01 | −2.448204E−01 | 8.184981E−02 | −9.863014E−02 | −1.424540E−01 | −7.188898E−03 |
| A6 | 9.427212E−01 | 1.507261E−02 | −1.331859E−02 | 1.853426E−01 | 8.591662E−02 | −5.175977E−02 |
| A8 | −7.574860E+00 | 5.309716E−01 | −7.476728E−01 | −2.515004E−01 | −1.400536E−01 | 4.216851E−02 |
| A10 | 4.403137E+01 | −5.983517E+00 | 2.456275E+00 | 2.038451E−01 | 1.491097E−01 | −1.789490E−02 |
| A12 | −1.502621E+02 | −3.543098E−01 | 4.073673E+00 | −3.884850E−02 | −8.946916E−02 | 4.474280E−03 |
| A14 | 3.205423E+02 | 2.108513E+00 | 3.917946E+00 | −8.429972E−02 | 3.050304E−02 | −6.782369E−04 |
| A16 | 4.179755E+02 | −2.876462E+00 | −2.198884E+00 | 7.040007E−02 | −5.880736E−03 | 6.047011E−05 |
| A18 | 3.013470E+02 | 1.739029E+00 | 6.689217E−01 | −2.100588E−02 | 5.985091E−04 | −2.918856E−06 |
| A20 | −9.139454E+01 | −3.908354E−01 | −8.528146E−02 | 2.212736E−03 | −2.503722E−05 | 6.064570E−08 |

The imaging lens in Example 7 achieves a ratio of a total track length to a diagonal length of an effective image area of the image sensor of 0.99, and a F number of 2.20. As shown in Table 13, the imaging lens in Example 7 satisfies the conditional expressions (1) to (24).

Figure 14:
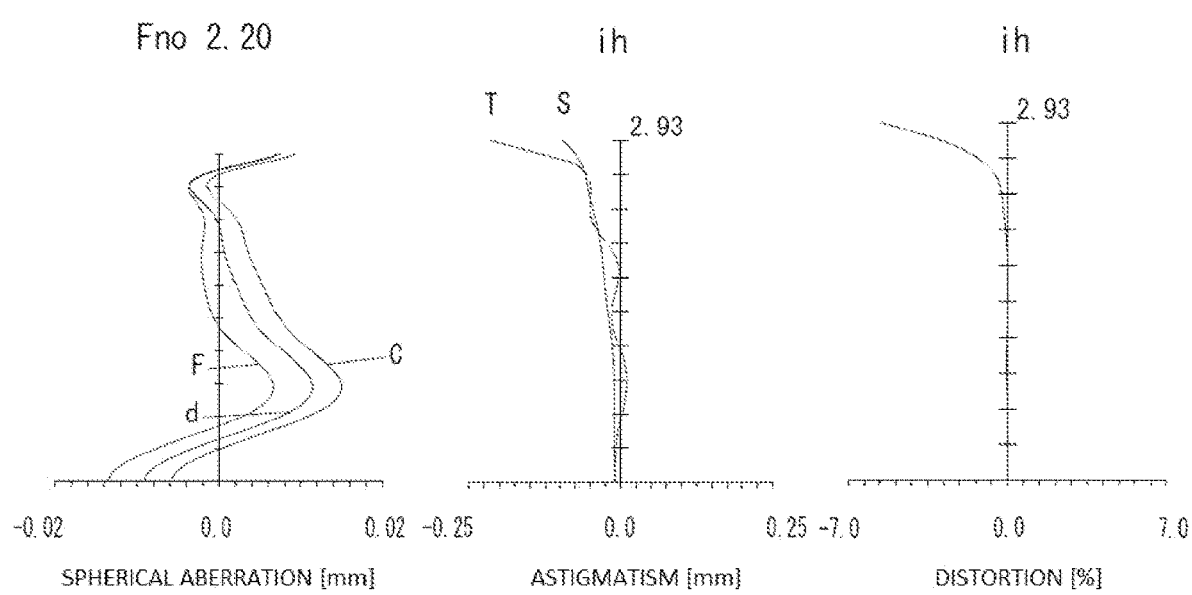
FIG. 14 shows spherical aberration, astigmatism, and distortion of the imaging lens in Example 7 according to the present invention.
Figure 15:
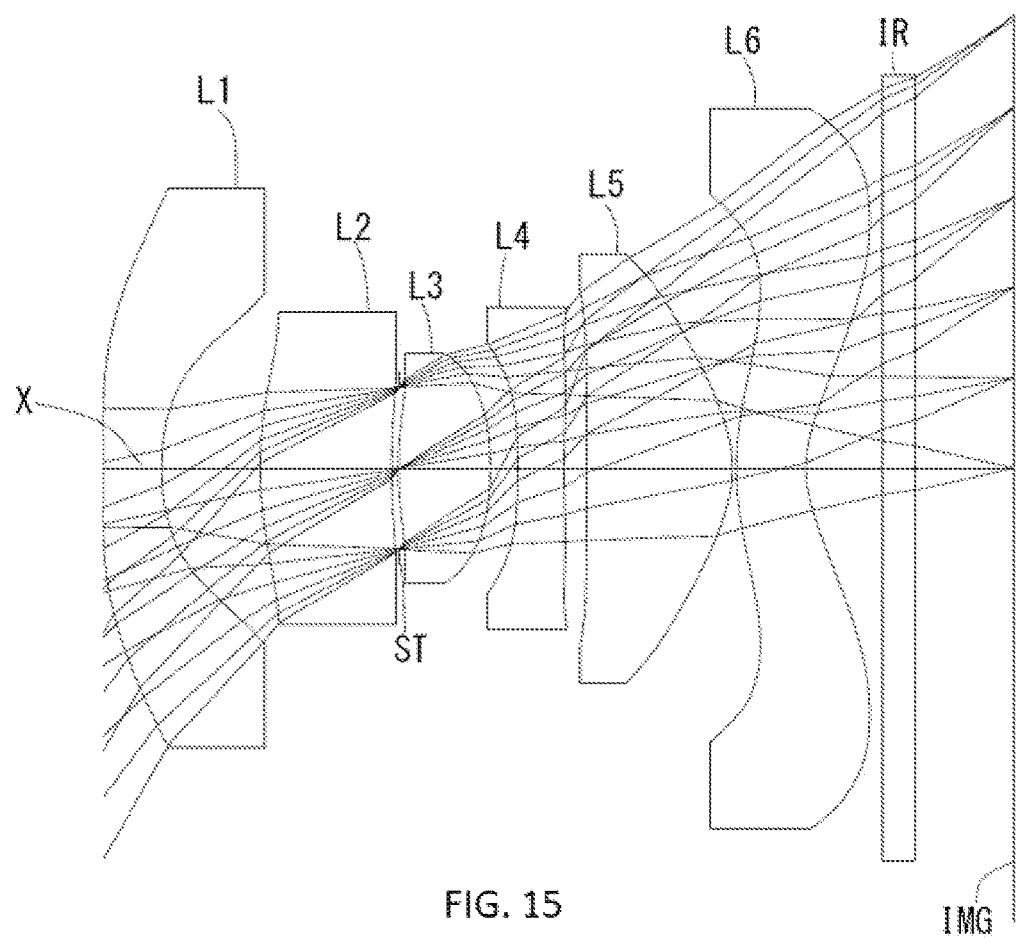
FIG. 15 is a schematic view showing an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

| Example 8 |
|---|
| Unit mm |

$f = 1.76$ $Fno = 2.20$ $\omega(°) = 60.4$

TABLE 8-continued

Example 8 h = 2.93
TTL = 5.83

Surface Data

| i | r | d | Nd | vd | |
|---|---|---|---|---|---|
| (Object) | Infinity | Infinity | | | |
| 1* | −11.3015 | 0.3744 | 1.535 | 55.69 | (vd1) |
| 2* | 1.6192 | 0.6382 | | | |
| 3* | 2.5697 | 0.8538 | 1.614 | 25.59 | (vd2) |
| 4* | 4.2172 | 0.0499 | | | |
| 5 (Stop) | Infinity | −0.0054 | | | |
| 6* | 2.3116 | 0.5946 | 1.544 | 55.93 | (vd3) |
| 7* | −2.0759 | 0.1757 | | | |
| 8* | −11.1491 | 0.3036 | 1.671 | 19.24 | (vd4) |
| 9* | 5.6536 | 0.1501 | | | |
| 10* | −23.9964 | 0.9417 | 1.535 | 55.69 | (vd5) |
| 11* | −0.8316 | 0.0251 | | | |
| 12* | 1.8782 | 0.4519 | 1.639 | 23.52 | (vd6) |
| 13* | 0.7519 | 0.5000 | | | |
| 14 | Infinity | 0.2100 | 1.517 | 64.20 | |
| 15 Image Plane | Infinity | 0.6370 | | | |

Constituent Lens Data

| Lens | Start Surface | Focal Length | TTL to diagonal length of effective image area |
|---|---|---|---|
| 1 | 1 | −2.622 | 0.99 |
| 2 | 3 | 8.946 | |
| 3 | 6 | 2.110 | |
| 4 | 8 | −5.553 | |
| 5 | 10 | 1.588 | |
| 6 | 12 | −2.325 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −7.390376E−01 | −3.092088E+00 | 1.313663E+01 | 0.000000E+00 | 5.752618E+00 |
| A4 | 2.781521E−01 | 3.792599E−01 | 2.226510E−03 | −1.561706E−01 | −2.912230E−01 | −3.110338E−01 |
| A6 | −3.015842E−01 | 5.584033E−02 | −1.853467E−01 | −6.049004E−01 | 8.680519E−01 | −2.599970E−01 |
| A8 | 2.606386E−01 | −1.481255E+00 | 7.341939E−01 | 4.626392E+00 | −7.710468E+00 | 5.552412E+00 |
| A10 | −1.676771E−01 | 4.668310E+00 | −2.420014E+00 | 3.719089E+01 | 4.402036E+01 | −4.190011E+01 |
| A12 | 7.674088E−02 | −8.594202E+00 | 5.046336E+00 | −6.356724E+02 | −1.808734E+02 | 1.795815E+02 |
| A14 | −2.406682E−02 | 1.024340E+01 | −6.757715E+00 | 3.634586E+03 | 5.574289E+02 | −4.694341E+02 |
| A16 | 4.875989E−03 | −7.766208E+00 | 5.510425E+00 | −1.046845E+04 | −1.278191E+03 | 7.393202E+02 |
| A18 | −5.718133E−04 | 3.298971E+00 | −2.424335E+00 | 1.525529E+04 | 1.766945E+03 | −6.459792E+02 |
| A20 | 2.944513E−05 | −5.827516E−01 | 4.356516E−01 | −8.914448E+03 | −9.907944E+02 | 2.389583E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −4.574402E+00 | −1.508438E+00 | −5.340238E+00 |
| A4 | −5.921110E−01 | −2.486113E−01 | 7.830053E−02 | −1.302702E−01 | −1.586131E−01 | −1.484562E−02 |
| A6 | 6.338669E−01 | 2.010226E−02 | −9.392281E−02 | 2.260290E−01 | 1.130553E−01 | −3.880920E−02 |
| A8 | −3.820469E+00 | 6.166277E−01 | −2.912468E−01 | −2.507796E−01 | −1.406226E−01 | 3.405309E−02 |
| A10 | 2.338458E+01 | −7.605009E−01 | 1.354676E+00 | 1.672448E−01 | 1.261178E−01 | −1.533266E−02 |
| A12 | −8.356892E+01 | −5.663548E−01 | −2.639345E+00 | −1.227799E−02 | −6.927482E−02 | 4.089712E−03 |
| A14 | 1.855945E+02 | 3.065396E+00 | 2.840270E+00 | −8.552629E−02 | 2.234350E−02 | −6.723899E−04 |
| A16 | −2.499509E+02 | −4.073813E+00 | −1.740307E+00 | 6.428021E−02 | 4.132813E−03 | 6.692402E−05 |
| A18 | 1.846426E+02 | 2.418947E+00 | 5.702222E−01 | −1.850307E−02 | 4.067346E−04 | −3.755819E−06 |
| A20 | −5.707372E+01 | −5.429153E−01 | −7.762985E−02 | 1.907643E−03 | −1.654861E−05 | 9.411929E−08 |

The imaging lens in Example 8 achieves a ratio of a total track length to a diagonal length of an effective image area of the image sensor of 0.99, and a F number of 2.20. As shown in Table 13, the imaging lens in Example 8 satisfies the conditional expressions (1) to (24).

Figure 16:
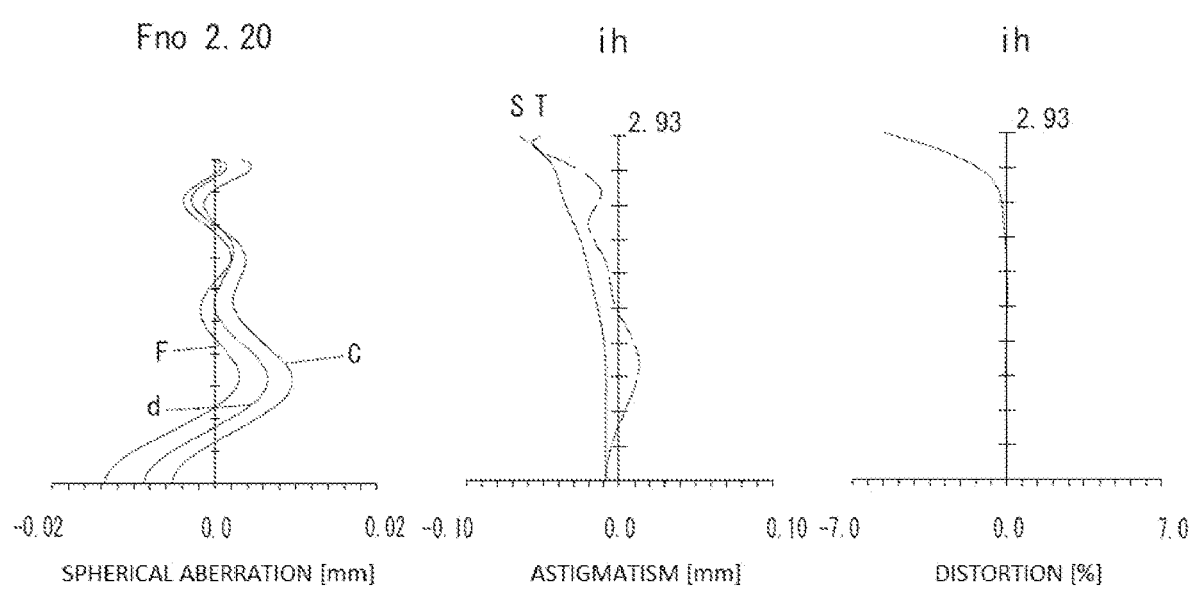
FIG. 16 shows spherical aberration, astigmatism, and distortion of the imaging lens in Example 8 according to the present invention.
Figure 17:
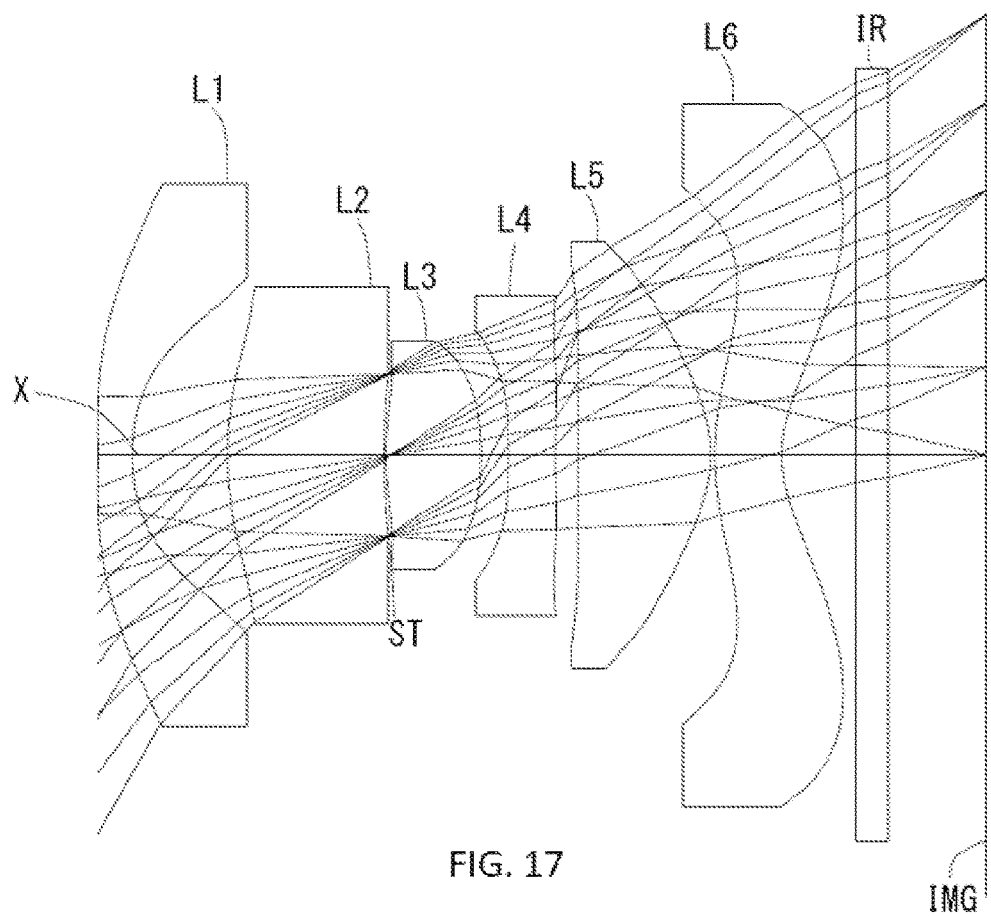
FIG. 17 shows a schematic view showing an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

Example 9

Unit mm f = 1.76
Fno = 2.20
ω(°) = 60.4
h = 2.93
TTL = 5.83

Surface Data

| i | r | d | Nd | vd | |
|---|---|---|---|---|---|
| (Object) | Infinity | Infinity | | | |
| 1* | −13.2100 | 0.2294 | 1.535 | 55.69 | (vd1) |
| 2* | 1.4659 | 0.6284 | | | |
| 3* | 2.2341 | 1.0452 | 1.588 | 28.36 | (vd2) |
| 4* | 3.2316 | 0.0279 | | | |
| 5 (Stop) | Infinity | −0.0145 | | | |
| 6* | 2.0189 | 0.6259 | 1.544 | 55.93 | (vd3) |
| 7* | −2.0805 | 0.1826 | | | |
| 8* | −8.7556 | 0.3126 | 1.671 | 19.24 | (vd4) |
| 9* | 6.6577 | 0.1528 | | | |
| 10* | −31.5511 | 0.8811 | 1.535 | 55.69 | (vd5) |
| 11* | −0.8438 | 0.0252 | | | |
| 12* | 1.8864 | 0.4419 | 1.614 | 25.59 | (vd6) |
| 13* | 0.7474 | 0.5000 | | | |
| 14 | Infinity | 0.2100 | 1.517 | 64.20 | |
| 15 | Infinity | 0.6501 | | | |
| Image Plane | | | | | |

Constituent Lens Data

| Lens | Start Surface | Focal Length | TTL to diagonal length of effective image area |
|---|---|---|---|
| 1 | 1 | −2.454 | 0.99 |
| 2 | 3 | 8.877 | |
| 3 | 6 | 1.990 | |
| 4 | 8 | −5.593 | |
| 5 | 10 | 1.605 | |
| 6 | 12 | −2.364 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −7.439544E−01 | −2.067500E+00 | −9.228876E+00 | 0.000000E+00 | 5.725710E+00 |
| A4 | 3.874370E−01 | 4.295247E−01 | −5.635930E−03 | −8.076408E−01 | −1.113895E+00 | −2.794754E−01 |
| A6 | −5.521697E−01 | 1.406023E−01 | −9.359627E−02 | 7.407224E+00 | 1.160967E+01 | −5.806082E−01 |
| A8 | 5.685883E−01 | −2.617019E+00 | 3.985760E−01 | −7.023760E+01 | −1.337604E+02 | 7.428919E+00 |
| A10 | 4.156912E−01 | 7.976822E+00 | −1.531973E+00 | 5.359157E+02 | 1.112471E+03 | 4.954108E+01 |
| A12 | 2.107686E−01 | −1.385506E+01 | 3.391029E+00 | −2.835661E+03 | −6.175854E+03 | 2.030623E+02 |
| A14 | −7.189574E−02 | 1.509851E+01 | 4.486306E+00 | 9.888089E+03 | 2.209220E+04 | −5.194796E+02 |
| A16 | 1.563297E−02 | −1.017110E+01 | 3.438325E+00 | −2.143915E+04 | 4.855036E+04 | 8.068421E+02 |
| A18 | −1.946111E−03 | 3.815372E+00 | −1.387411E+00 | 2.604098E+04 | 5.918051E+04 | −6.967138E+02 |
| A20 | 1.051192E−04 | −6.003277E−01 | 2.271152E−01 | −1.345682E+04 | −3.039530E+04 | 2.548438E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −4.692612E+00 | −1.542086E+00 | −5.424661E+00 |
| A4 | −5.707747E−01 | −2.343296E−01 | 1.019602E−01 | −8.316522E−02 | −1.382597E−01 | −3.685056E−03 |
| A6 | 2.668679E−01 | −1.936473E−01 | −2.158141E−01 | 1.381607E−01 | 6.612008E−02 | −6.048973E−02 |
| A8 | −8.191564E−01 | 1.760743E+00 | 8.041075E−02 | −1.862689E−01 | −1.095175E−01 | 5.203544E−02 |
| A10 | 9.460264E+00 | −4.433759E+00 | 5.644507E−01 | 1.741715E−01 | 1.261897E−01 | −2.374209E−02 |
| A12 | 4.575144E+01 | 6.899408E+00 | −1.442880E+00 | −6.154330E−02 | −7.983426E−02 | 6.489841E−03 |
| A14 | 1.267669E+02 | −6.466391E+00 | 1.644430E+00 | −4.910072E−02 | 2.810418E−02 | −1.098965E−03 |
| A16 | −2.016025E+02 | 3.306747E+00 | −1.007044E+00 | 5.239653E−02 | −5.527885E−03 | 1.129327E−04 |
| A18 | 1.676818E+02 | −7.441816E−01 | 3.221336E−01 | −1.675032E−02 | 5.700993E−04 | −6.512169E−06 |
| A20 | −5.642177E+01 | 2.671206E−02 | 4.234003E−02 | 1.822770E−03 | −2.407073E−05 | 1.645181E−07 |

The imaging lens in Example 9 achieves a ratio of a total track length to a diagonal length of an effective image area of the image sensor of 0.99, and a F number of 2.20. As shown in Table 13, the imaging lens in Example 9 satisfies the conditional expressions (1) to (24).

Figure 18:
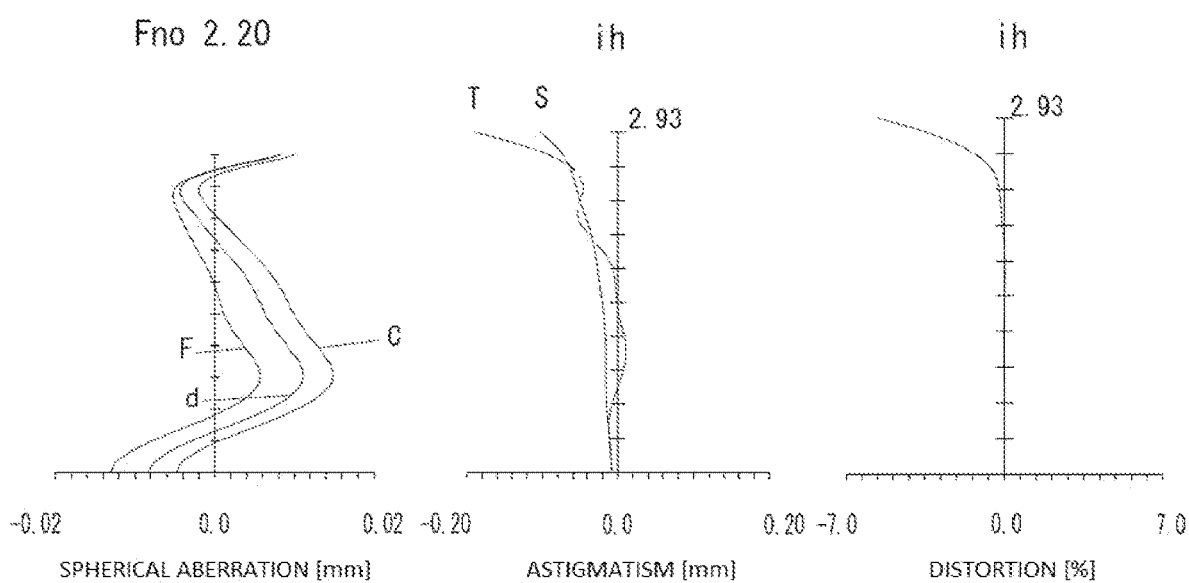
FIG. 18 shows spherical aberration, astigmatism, and distortion of the imaging lens in Example 9 according to the present invention.
Figure 19:
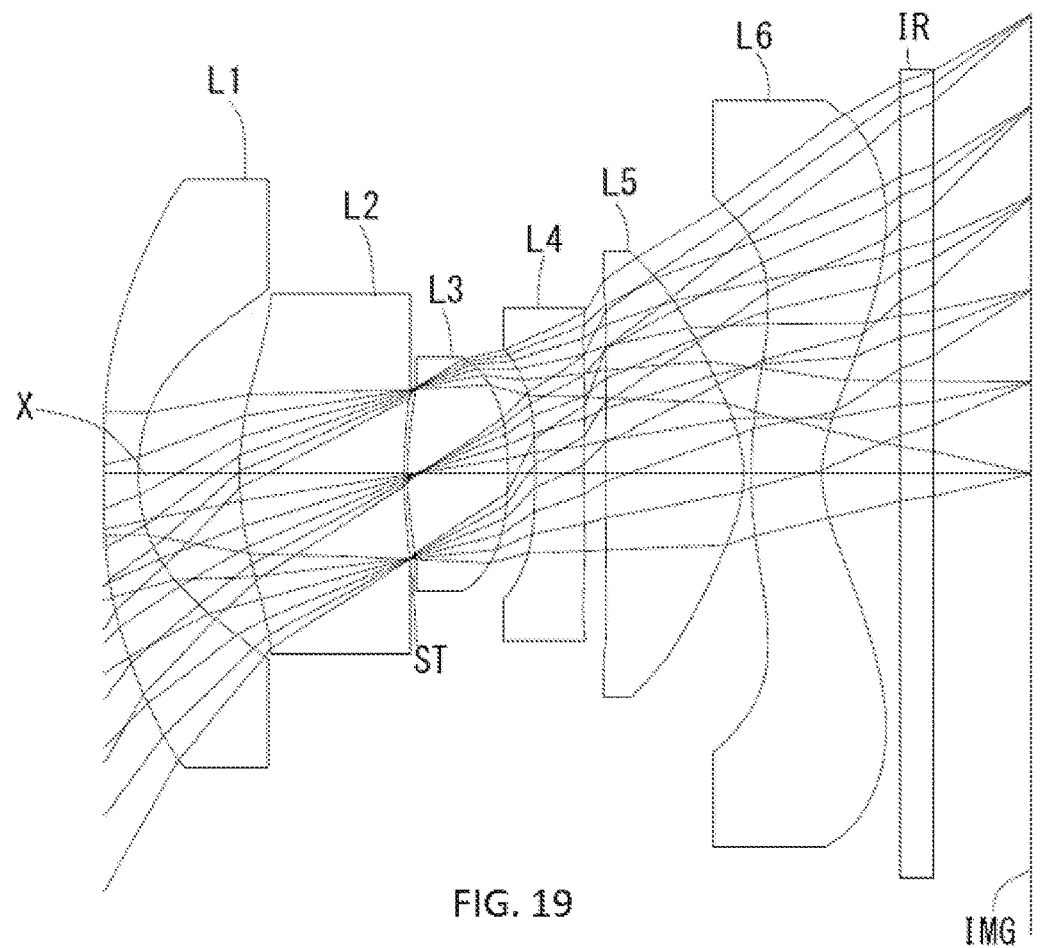
FIG. 19 is a schematic view showing an imaging lens in Example 10 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example 10

Unit mm f = 1.76
Fno = 2.20
ω(°) = 60.4
h = 2.93
TTL = 5.83

Surface Data

| i | r | d | Nd | vd | |
|---|---|---|---|---|---|
| (Object) | Infinity | Infinity | | | |
| 1* | −17.8963 | 0.2174 | 1.535 | 55.69 | (vd1) |
| 2* | 1.3445 | 0.6455 | | | |
| 3* | 2.0877 | 1.0454 | 1.588 | 28.36 | (vd2) |
| 4* | 3.0990 | 0.0403 | | | |
| 5 (Stop) | Infinity | −0.0197 | | | |
| 6* | 1.9239 | 0.6406 | 1.535 | 55.69 | (vd3) |
| 7* | −2.1602 | 0.1713 | | | |
| 8* | −12.0625 | 0.3133 | 1.671 | 19.24 | (vd4) |
| 9* | 5.9427 | 0.1387 | | | |
| 10* | −136.8658 | 0.8779 | 1.535 | 55.69 | (vd5) |
| 11* | −0.7737 | 0.0482 | | | |
| 12* | 2.8379 | 0.4498 | 1.588 | 28.36 | (vd6) |
| 13* | 0.7551 | 0.5000 | | | |
| 14 | Infinity | 0.2100 | 1.517 | 64.20 | |
| 15 | Infinity | 0.6207 | | | |
| Image Plane | | | | | |

Constituent Lens Data

| Lens | Start Surface | Focal Length | TTL to diagonal length of effective image area |
|---|---|---|---|
| 1 | 1 | −2.329 | 0.99 |
| 2 | 3 | 7.876 | |
| 3 | 6 | 2.013 | |
| 4 | 8 | −5.894 | |
| 5 | 10 | 1.452 | |
| 6 | 12 | −1.903 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −7.715211E−01 | −2.528856E+00 | 6.334295E+00 | 0.000000E+00 | 6.840130E+00 |
| A4 | 3.834650E−01 | 2.585257E−01 | −2.300707E−02 | −5.428627E−01 | −1.201873E+00 | −2.434530E−01 |
| A6 | −5.904816E−01 | 1.592541E+00 | 6.866934E−02 | 8.015787E+00 | 2.765823E+01 | 4.511481E−01 |
| A8 | 6.515331E−01 | −1.014975E+01 | −2.805425E−01 | −1.274071E+02 | −4.837251E+02 | 2.700828E+00 |
| A10 | −5.030833E−01 | 3.051738E+01 | 1.179743E+00 | 1.334816E+03 | 5.215444E+03 | −9.174307E−01 |
| A12 | 2.664629E−01 | −5.484220E+01 | 1.104807E+00 | −8.784311E+03 | −3.536346E+04 | −5.730015E+01 |
| A14 | −9.401086E−02 | 6.114020E+01 | −2.722984E+00 | 3.619996E+04 | 1.513419E+05 | 2.816604E+02 |
| A16 | 2.097632E−02 | 4.127721E+01 | 2.771157E+00 | −9.055129E+04 | −3.969441E+05 | −6.255840E+02 |
| A18 | −2.665020E−03 | 1.538580E+01 | −1.325160E+00 | 1.255405E+05 | 5.826385E+05 | 6.886927E+02 |
| A20 | 1.464412E−04 | −2.420808E+00 | 2.443991E−01 | −7.393995E+04 | −3.666952E+05 | −3.051204E+02 |

| | 8th Surface | 9th Surface | 10th Surface | 11th Surface | 12th Surface | 13th Surface |
|---|---|---|---|---|---|---|
| k | 0.000000E+00 | 0.000000E+00 | 0.000000E+00 | −3.856689E+00 | −8.731326E−01 | −6.090555E+00 |
| A4 | −4.304895E−01 | −1.852004E−01 | 8.243150E−02 | 1.472187E−02 | −4.162114E−02 | 3.028818E−03 |
| A6 | −1.610095E+00 | −6.009428E−01 | −2.894887E−01 | −1.666382E−02 | −6.943614E−02 | −5.855389E−02 |

TABLE 10-continued

Example 10

| | | | | | | |
|---|---|---|---|---|---|---|
| A8 | 1.432912E+01 | 3.760120E+00 | 7.219190E−01 | −2.034053E−01 | 3.914621E−02 | 5.241559E−02 |
| A10 | −6.558226E+01 | −1.057229E+01 | −1.253726E+00 | 7.447619E−01 | 2.196104E−02 | −2.666411E−02 |
| A12 | 1.838163E+02 | 1.891399E+01 | 1.414030E+00 | −1.116769E+00 | 4.052033E−02 | 8.444299E−03 |
| A14 | −3.118688E+02 | −2.152265E+01 | −1.027101E+00 | 8.884270E−01 | 2.253131E−02 | −1.703739E−03 |
| A16 | 3.008302E+02 | 1.494598E+01 | 4.637276E−01 | −3.986450E−01 | −6.349139E−03 | 2.137880E−04 |
| A18 | −1.406798E+02 | −5.767600E+00 | −1.179125E−01 | 9.550760E−02 | 9.264144E−04 | −1.527569E−05 |
| A20 | 2.001556E+01 | 9.478553E−01 | 1.287852E−02 | −9.471180E−03 | −5.593037E−05 | 4.749803E−07 |

The imaging lens in Example 10 achieves a ratio of a total track length to a diagonal length of an effective image area of the image sensor of 0.99, and a F number of 2.20. As shown in Table 13, the imaging lens in Example 10 satisfies the conditional expressions (1) to (24).

Figure 20:
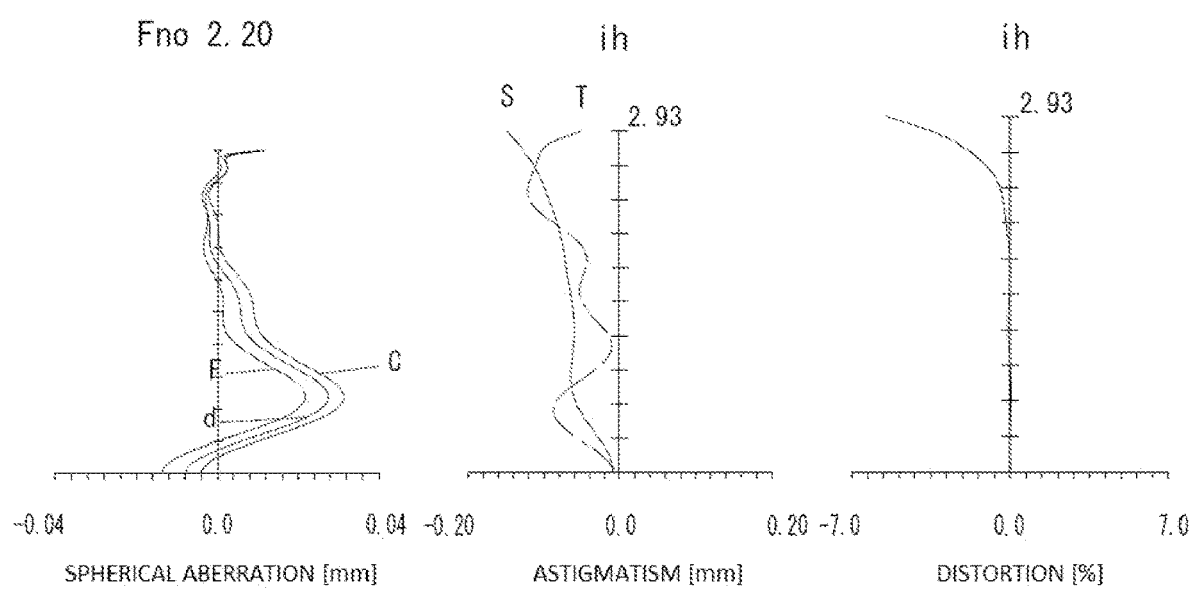
FIG. 20 shows spherical aberration, astigmatism, and distortion of the imaging lens in Example 10 according to the present invention.
Figure 21:
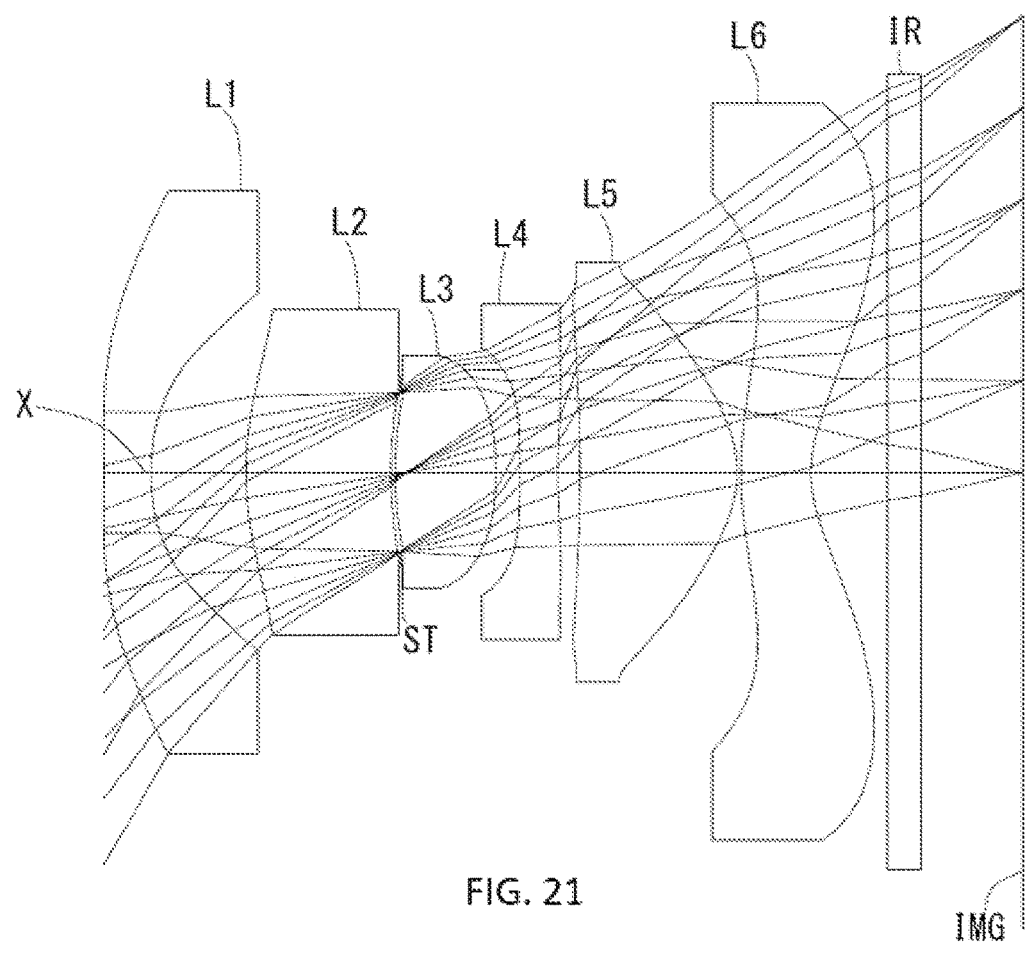
FIG. 21 is a schematic view showing an imaging lens in Example 11 according to the present invention.

FIG. 20 shows spherical aberration (mm), astigmatism (mm), and distortion (%) of the imaging lens in Example 10. As shown in FIG. 20, each aberration is corrected excellently.

Example 11

The basic lens data is shown below in Table 11.

TABLE 11

Example 11

Unit mm $f = 1.76$
$Fno = 2.20$
$\omega(°) = 60.4$
$h = 2.93$
$TTL = 5.83$

Surface Data

| i | r | d | Nd | vd | |
|---|---|---|---|---|---|
| (Object) | Infinity | Infinity | | | |
| 1* | −12.9986 | 0.2999 | 1.535 | 55.69 | (vd1) |
| 2* | 1.5213 | 0.6100 | | | |
| 3* | 2.1776 | 0.9304 | 1.614 | 25.59 | (vd2) |
| 4* | 2.6161 | 0.0619 | | | |
| 5 (Stop) | Infinity | −0.0360 | | | |
| 6* | 1.9805 | 0.6484 | 1.535 | 55.69 | (vd3) |
| 7* | −1.9004 | 0.1531 | | | |
| 8* | −82.8973 | 0.2451 | 1.639 | 23.52 | (vd4) |
| 9* | 3.7032 | 0.1460 | | | |
| 10* | −12.0659 | 1.0063 | 1.535 | 55.69 | (vd5) |
| 11* | −0.6867 | 0.0250 | | | |
| 12* | 2.5520 | 0.4463 | 1.614 | 25.59 | (vd6) |
| 13* | 0.7055 | 0.5000 | | | |
| 14 | Infinity | 0.2100 | 1.517 | 64.20 | |
| 15 | Infinity | 0.6527 | | | |
| Image Plane | | | | | |

Constituent Lens Data

| Lens | Start Surface | Focal Length | TTL to diagonal length of effective image area |
|---|---|---|---|
| 1 | 1 | −2.528 | 0.99 |
| 2 | 3 | 11.702 | |
| 3 | 6 | 1.925 | |
| 4 | 8 | −5.540 | |
| 5 | 10 | 1.321 | |
| 6 | 12 | −1.748 | |

Aspheric Surface Data

| | 1st Surface | 2nd Surface | 3rd Surface | 4th Surface | 6th Surface | 7th Surface |
|---|---|---|---|---|---|---|
| k | 0.000000E+00 | −1.042786E+00 | −2.445653E+00 | 2.067694E+01 | 0.000000E+00 | 5.287496E+00 |
| A4 | 3.012720E−01 | 3.890696E−01 | −6.546607E−03 | −4.984817E−01 | −5.770316E−01 | −2.478731E−01 |

TABLE 11-continued

Example 11

|     |               |               |               |               |               |               |
| --- | ------------- | ------------- | ------------- | ------------- | ------------- | ------------- |
| A6  | −3.912817E−01 | −1.522072E−01 | −2.262960E−01 | 6.506655E+00  | 1.114434E+01  | 1.071598E−01  |
| A8  | 3.946466E−01  | −1.148292E+00 | 1.357831E+00  | −1.275221E+02 | −1.995091E+02 | −2.278442E+00 |
| A10 | −2.880373E−01 | 4.762078E+00  | −5.197556E+00 | 1.577302E+03  | 2.227456E+03  | 2.300186E+01  |
| A12 | 1.458996E−01  | −9.748612E+00 | 1.184059E+01  | −1.253131E+04 | −1.565111E+04 | −1.249733E+02 |
| A14 | −4.941762E−02 | 1.185125E+01  | −1.643053E+01 | 6.361170E+04  | 6.901395E+04  | 3.908987E+02  |
| A16 | 1.057702E−02  | −8.585469E+00 | 1.347029E+01  | −2.004744E+05 | −1.851566E+05 | −7.310491E+02 |
| A18 | −1.284174E−03 | 3.368291E+00  | −5.937875E+00 | 3.578065E+05  | 2.757231E+05  | 7.669402E+02  |
| A20 | 6.710149E−05  | −5.418642E−01 | 1.079600E+00  | −2.776456E+05 | −1.747463E+05 | −3.501553E+02 |

|     | 8th Surface   | 9th Surface   | 10th Surface  | 11th Surface  | 12th Surface  | 13th Surface  |
| --- | ------------- | ------------- | ------------- | ------------- | ------------- | ------------- |
| k   | 0.000000E+00  | 0.000000E+00  | 0.000000E+00  | −4.364050E+00 | −1.111500E+00 | −5.670703E+00 |
| A4  | −5.517960E−01 | −3.204942E−01 | −2.856842E−02 | −3.449526E−01 | −8.860498E−02 | −3.082183E−02 |
| A6  | −7.493839E−01 | 4.489366E−02  | 1.072630E−01  | 8.748110E−01  | −4.858869E−02 | −1.576943E−02 |
| A8  | 9.528033E+00  | 1.425826E+00  | −4.682513E−01 | −2.086883E+00 | 1.121399E−01  | 2.202832E−02  |
| A10 | −5.656850E+01 | −4.440507E+00 | 1.471584E+00  | 3.614565E+00  | −1.198794E−01 | −1.375410E−02 |
| A12 | 2.087302E+02  | 7.728090E+00  | −2.651420E+00 | −4.249270E+00 | 8.112066E−02  | 5.236622E−03  |
| A14 | −4.923798E+02 | −8.587287E+00 | 2.715727E+00  | 3.301159E+00  | −3.585908E−02 | −1.272403E−03 |
| A16 | 7.116300E+02  | 6.040575E+00  | −1.562570E+00 | −1.623220E+00 | 9.870453E−03  | 1.912808E−04  |
| A18 | −5.743257E+02 | −2.445460E+00 | 4.721374E−01  | 4.559340E−01  | −1.518327E−03 | −1.615430E−05 |
| A20 | 1.969638E+02  | 4.305496E−01  | −5.847632E−02 | −5.521997E−02 | 9.916019E−05  | 5.832024E−07  |

The imaging lens in Example 11 achieves a ratio of a total track length to a diagonal length of an effective image area of the image sensor of 0.99, and a F number of 2.20. As shown in Table 13, the imaging lens in Example 11 satisfies the conditional expressions (1) to (24).

Figure 22:
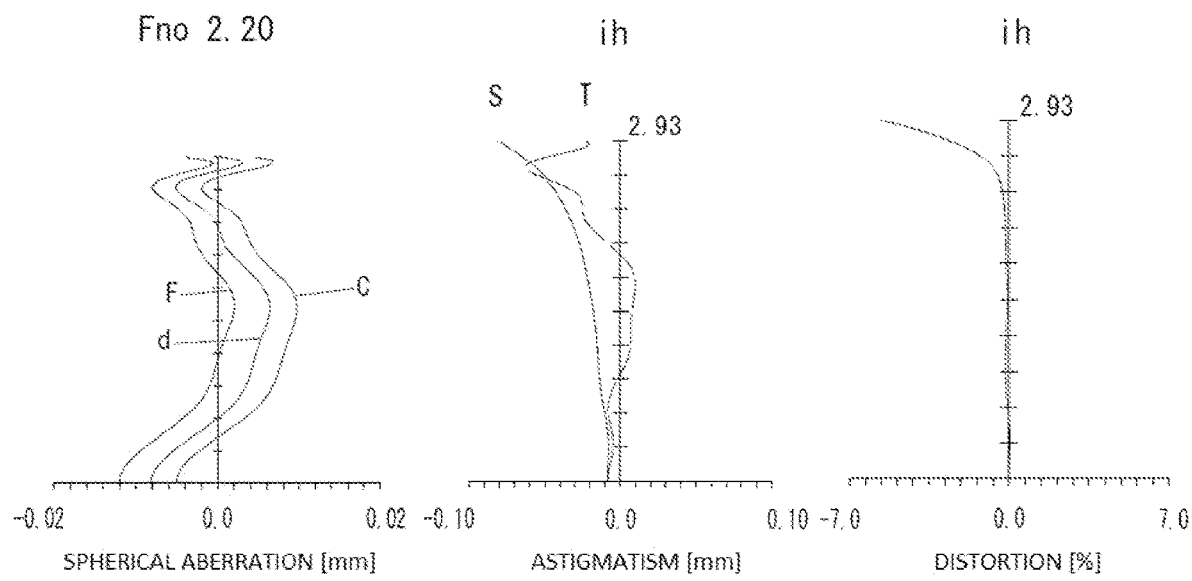
FIG. 22 shows spherical aberration, astigmatism, and distortion of the imaging lens in Example 11 according to the present invention.

FIG. 22 shows spherical aberration (mm), astigmatism (mm), and distortion (%) of the imaging lens in Example 11. As shown in FIG. 22, each aberration is corrected excellently.

Example 12

The basic lens data is shown below in Table 12.

TABLE 12

Example 12

Unit mm f = 1.77
Fno = 2.20
ω(°) = 60.3
h = 2.93
TTL = 5.81

Surface Data

| i         | r        | d        | Nd    | vd    |       |
| --------- | -------- | -------- | ----- | ----- | ----- |
| (Object)  | Infinity | Infinity |       |       |       |
| 1*        | −7.2706  | 0.3000   | 1.535 | 55.69 | (vd1) |
| 2*        | 2.2389   | 0.6321   |       |       |       |
| 3*        | 3.4340   | 0.4464   | 1.614 | 25.59 | (vd2) |
| 4*        | 10.7707  | 0.0910   |       |       |       |
| 5 (Stop)  | Infinity | 0.0075   |       |       |       |
| 6*        | 6.1116   | 0.7875   | 1.535 | 55.69 | (vd3) |
| 7*        | −1.8863  | 0.0353   |       |       |       |
| 8*        | 16.3164  | 0.2705   | 1.639 | 23.52 | (vd4) |
| 9*        | 2.7213   | 0.1649   |       |       |       |
| 10*       | 8.3208   | 1.3300   | 1.535 | 55.69 | (vd5) |
| 11*       | −0.8035  | 0.0255   |       |       |       |

TABLE 12-continued

Example 12

| | | | | | |
|---|---|---|---|---|---|
| 12* | 1.7215 | 0.4445 | 1.661 | 20.37 | (vd6) |
| 13* | 0.6700 | 0.5000 | | | |
| 14 | Infinity | 0.2100 | 1.517 | 64.17 | |
| 15 | Infinity | 0.6406 | | | |
| Image Plane | | | | | |

Constituent Lens Data

| Lens | Start Surface | Focal Length | TTL to diagonal length of effective image area |
|---|---|---|---|
| 1 | 1 | −3.166 | 0.99 |
| 2 | 3 | 8.022 | |
| 3 | 6 | 2.791 | |
| 4 | 8 | −5.150 | |
| 5 | 10 | 1.443 | |
| 6 | 12 | −1.996 | |

Aspheric Surface Data

| | 1st Surface | 2nd Surface | 3rd Surface | 4th Surface | 6th Surface | 7th Surface |
|---|---|---|---|---|---|---|
| k | 1.674739E+01 | −1.451202E+01 | −1.151051E+01 | 3.906584E+01 | 5.659990E+01 | 3.786313E+00 |
| A4 | 3.621312E−01 | 6.139120E−01 | 2.095309E−02 | 1.325670E−01 | 1.426227E−01 | −4.516208E−02 |
| A6 | −3.854243E−01 | −4.487949E−01 | −2.783818E−01 | 8.519651E−03 | −3.275085E−02 | −7.105793E−01 |
| A8 | 3.294913E−01 | 1.568233E−01 | 1.105995E+00 | −1.112867E+00 | −1.988139E−01 | 2.440606E+00 |
| A10 | −1.912147E−01 | 2.216115E−01 | −3.451283E+00 | 4.866071E+00 | −5.908610E+00 | −4.271652E+00 |
| A12 | 7.051613E−02 | −1.178863E−01 | 5.440824E+00 | −1.780652E+01 | 2.649419E+01 | 1.477042E+00 |
| A14 | −1.477493E−02 | −2.192316E−01 | −4.066587E+00 | 4.145219E+01 | −4.600486E+01 | 3.822295E+00 |
| A16 | 1.356911E−03 | 1.467520E−01 | 1.159761E+00 | −4.004259E+01 | 1.788689E+01 | −3.208151E+00 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | 8th Surface | 9th Surface | 10th Surface | 11th Surface | 12th Surface | 13th Surface |
|---|---|---|---|---|---|---|
| k | 9.900000E+01 | −3.086870E+01 | −2.209333E+01 | −2.669430E+00 | −1.767795E+01 | −4.299812E+00 |
| A4 | −3.311621E−01 | −3.334705E−02 | 5.241034E−03 | 4.139769E−02 | 2.721195E−02 | −4.595677E−02 |
| A6 | 4.233205E−01 | −2.239723E−01 | −2.317123E−02 | −2.751248E−01 | −1.961928E−01 | −1.100607E−03 |
| A8 | 1.217187E+00 | 4.955572E−01 | 3.009815E−02 | 4.458305E−01 | 2.240105E−01 | 3.113131E−03 |
| A10 | −2.263142E+00 | −5.418211E−01 | −7.370547E−02 | −4.276420E−01 | −1.747028E−01 | −6.816005E−04 |
| A12 | 2.080109E+00 | 3.203680E−01 | −9.920907E−03 | 2.417483E−01 | 8.205595E−02 | 2.180670E−05 |
| A14 | −2.349204E+00 | −8.112632E−02 | 6.462908E−03 | −7.279563E−02 | −2.069409E−02 | 7.680130E−06 |
| A16 | 1.809408E+00 | 4.731133E−03 | −1.069271E−03 | 8.934193E−03 | 2.115693E−03 | −6.740878E−07 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 12 achieves a ratio of a total track length to a diagonal length of an effective image area of the image sensor of 0.99, and a F number of 2.20. As shown in Table 13, the imaging lens in Example 12 satisfies the conditional expressions (1) to (24).

Figure 24:
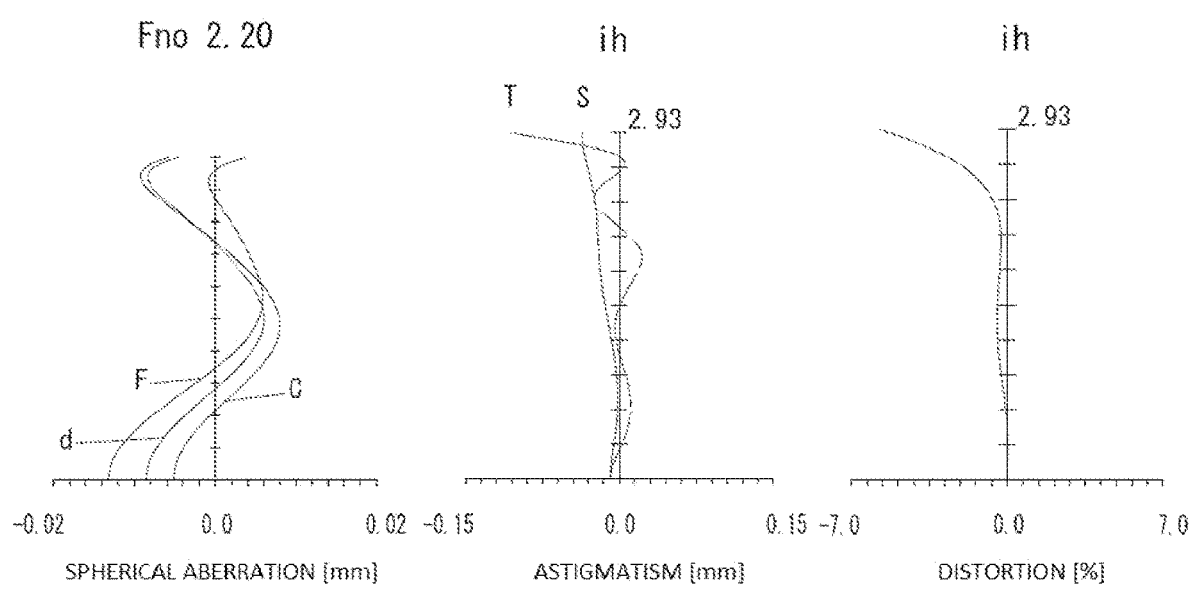
FIG. 24 shows spherical aberration, astigmatism, and distortion of the imaging lens in Example 12 according to the present invention.

FIG. 24 shows spherical aberration (mm), astigmatism (mm), and distortion (%) of the imaging lens in Example 12. As shown in FIG. 24, each aberration is corrected excellently.

In table 13, values of conditional expressions (1) to (24) related to Examples 1 to 12 are shown.

TABLE 13

| | Conditional Expression | Example 1 | Example 2 | Example 3 | Example 4 | Example 5 | Example 6 |
|---|---|---|---|---|---|---|---|
| (1) | r3/f | 1.57 | 1.85 | 1.77 | 1.27 | 1.28 | 1.50 |
| (2) | r11/(T5 + D6) | 4.64 | 5.12 | 5.19 | 4.10 | 3.98 | 4.02 |
| (3) | r3/(T2/T1) | 27.08 | 58.96 | 51.98 | 92.72 | 101.12 | 40.09 |
| (4) | vd2 | 23.52 | 19.24 | 19.24 | 28.30 | 28.36 | 25.59 |
| (5) | (T5/TTL) × 100 | 1.25 | 0.43 | 0.43 | 0.43 | 0.43 | 0.47 |
| (6) | r1/(D1 + T1) | −7.47 | −10.78 | −11.74 | −19.76 | −15.00 | −10.94 |
| (7) | r10/T5 | −13.21 | −40.14 | −39.53 | −34.06 | −33.77 | −30.35 |
| (8) | r11/T5 | 30.88 | 113.94 | 113.08 | 73.84 | 73.90 | 70.97 |
| (9) | vd6 | 23.52 | 28.30 | 28.30 | 25.59 | 25.59 | 23.52 |
| (10) | T4/T5 | 5.72 | 8.33 | 9.11 | 6.51 | 6.16 | 6.01 |
| (11) | (T5/f6) × 100 | −2.94 | −1.07 | −1.08 | −1.06 | −1.05 | −1.19 |

TABLE 13-continued

|  | | Example 1 | Example 2 | Example 3 | Example 4 | Example 5 | Example 6 |
|---|---|---|---|---|---|---|---|
| (12) | f1/f2 | −0.25 | −0.15 | −0.15 | −0.19 | −0.29 | −0.30 |
| (13) | f2/f | 5.77 | 9.09 | 9.51 | 7.08 | 4.92 | 5.02 |
| (14) | f6/D6 | −6.02 | −4.41 | −4.44 | −5.55 | −5.44 | −5.05 |
| (15) | f6/f1 | 0.94 | 0.95 | 0.95 | 0.98 | 0.97 | 0.87 |
| (16) | r1/f | −4.23 | −5.61 | −6.31 | −9.48 | −7.25 | −6.28 |
| (17) | r2/r1/D1 | −0.77 | −0.63 | −0.55 | −0.38 | −0.52 | −0.39 |
| (18) | r4/(T2/T1) | 41.58 | 73.97 | 63.21 | 110.75 | 149.72 | 68.65 |
| (19) | r6/r11 | −0.67 | −0.91 | −0.90 | −1.18 | −1.10 | −1.08 |
| (20) | |r9|/f | 4.39 | 9.46 | 10.04 | 22.23 | 24.54 | 20.09 |
| (21) | r10/f | −0.53 | −0.57 | −0.57 | −0.48 | −0.48 | −0.47 |
| (22) | r11/f | 1.23 | 1.62 | 1.62 | 1.05 | 1.05 | 1.09 |
| (23) | r11/f6 | −0.91 | −1.22 | −1.22 | −0.78 | −0.77 | −0.85 |
| (24) | r11/r12 | 2.61 | 3.30 | 3.30 | 2.49 | 2.49 | 2.56 |
|  | Conditional Expression | Example 7 | Example 8 | Example 9 | Example 10 | Example 11 | Example 12 |
| (1) | r3/f | 1.27 | 1.46 | 1.27 | 1.18 | 1.23 | 1.94 |
| (2) | r11/(T5 + D6) | 4.01 | 3.94 | 4.04 | 5.70 | 5.41 | 3.66 |
| (3) | r3/(T2/T1) | 103.68 | 36.91 | 104.77 | 65.44 | 51.32 | 22.04 |
| (4) | νd2 | 28.36 | 25.59 | 28.36 | 28.36 | 25.59 | 25.59 |
| (5) | (T5/TTL) × 100 | 0.45 | 0.43 | 0.43 | 0.83 | 0.43 | 0.44 |
| (6) | r1/(D1 + T1) | −15.09 | −11.16 | −15.40 | −20.74 | −14.29 | −7.80 |
| (7) | r10/T5 | −32.49 | −33.08 | −33.52 | −16.05 | −27.47 | −31.51 |
| (8) | r11/T5 | 71.91 | 74.71 | 74.94 | 58.87 | 102.08 | 67.50 |
| (9) | νd6 | 25.59 | 23.52 | 25.59 | 28.36 | 25.59 | 20.37 |
| (10) | T4/T5 | 5.93 | 5.97 | 6.07 | 2.88 | 5.84 | 6.46 |
| (11) | (T5/f6) × 100 | −1.09 | −1.08 | −1.06 | −2.53 | −1.43 | −1.28 |
| (12) | f1/f2 | −0.29 | −0.29 | −0.28 | −0.30 | −0.22 | −0.39 |
| (13) | f2/f | 4.88 | 5.07 | 5.03 | 4.47 | 6.64 | 4.53 |
| (14) | f6/D6 | −5.40 | −5.15 | −5.35 | −4.23 | −3.92 | −4.49 |
| (15) | f6/f1 | 0.97 | 0.89 | 0.96 | 0.82 | 0.69 | 0.63 |
| (16) | r1/f | −7.32 | −6.41 | −7.49 | −10.16 | −7.37 | −4.11 |
| (17) | r2/r1/D1 | −0.51 | −0.38 | −0.48 | −0.35 | −0.39 | −1.03 |
| (18) | r4/(T2/T1) | 153.77 | 60.57 | 151.55 | 97.14 | 61.65 | 69.12 |
| (19) | r6/r11 | −1.09 | −1.11 | −1.10 | −0.76 | −0.74 | −1.10 |
| (20) | |r9|/f | 20.25 | 13.61 | 17.90 | 77.68 | 6.84 | 4.70 |
| (21) | r10/f | −0.48 | −0.47 | −0.48 | −0.44 | −0.39 | −0.45 |
| (22) | r11/f | 1.06 | 1.07 | 1.07 | 1.61 | 1.45 | 0.97 |
| (23) | r11/f6 | −0.79 | −0.81 | −0.80 | −1.49 | −1.46 | −0.86 |
| (24) | r11/r12 | 2.50 | 2.50 | 2.52 | 3.76 | 3.62 | 2.57 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
IR: filter
IMG: imaging plane

What is claimed is:
1. An imaging lens comprising, in order from an object side to an image side,
   a first lens with negative refractive power,
   a second lens with positive refractive power,
   a third lens with positive refractive power,
   a fourth lens with negative refractive power,
   a fifth lens with positive refractive power, and
   a sixth lens with negative refractive power,
   wherein said first lens has an object-side surface being concave in a paraxial region,
   said second lens has an image-side surface being concave in a paraxial region,
   said third lens has an object-side surface and an image-side surface being convex in a paraxial region,
   said fourth lens has an image-side surface being concave in a paraxial region, and
   said sixth lens has an image-side surface being concave in a paraxial region, and
   the following conditional expressions (1), (2'), (3) and (12) are satisfied:

$$0.30 < r3/f < 4.00 \qquad (1)$$

$$3.66 \leq r11/(T5+D6) \leq 5.70 \qquad (2')$$

$$11.00 < r3/(T2/T1) \qquad (3)$$

$$-0.60 < f1/f2 < -0.05 \qquad (12)$$

where
r3: a paraxial curvature radius of an object-side surface of the second lens,
f: a focal length of the overall optical system of the imaging lens,
r11: a paraxial curvature radius of an object-side surface of the sixth lens,
T5: a distance along the optical axis from an image-side surface of the fifth lens to an object-side surface of the sixth lens,
D6: a thickness along the optical axis of the sixth lens,
T2: a distance along the optical axis from an image-side surface of the second lens to an object-side surface of the third lens, T1: a distance along the optical axis from an image-side surface of the first lens to an object-side surface of the second lens,
f1: a focal length of the first lens, and
f2: a focal length of the second lens.

2. The imaging lens according to claim 1, wherein an image-side surface of said first lens is concave in a paraxial region.

3. The imaging lens according to claim 1, wherein the following conditional expression (4) is satisfied:

$$10.00 < vd2 < 40.00 \tag{4}$$

where
vd2: an abbe number at d-ray of the second lens.

4. The imaging lens according to claim 1, wherein the following conditional expression (5) is satisfied:

$$0.10 < (T5/TTL) \times 100 < 3.00 \tag{5}$$

where
T5: a distance along the optical axis from an image-side surface of the fifth lens to an object-side surface of the sixth lens, and
TTL: a total track length.

5. The imaging lens according to claim 1, wherein the following conditional expression (6) is satisfied:

$$-29.00 < r1/(D1+T1) < -4.10 \tag{6}$$

where
r1: a paraxial curvature radius of an object-side surface of the first lens,
D1: a thickness along the optical axis of the first lens, and
T1: a distance along the optical axis from an image-side surface of the first lens to an object-side surface of the second lens.

6. The imaging lens according to claim 1, wherein the following conditional expression (7) is satisfied:

$$r10/T5 < -6.25 \tag{7}$$

where
r10: a paraxial curvature radius of an image-side surface of the fifth lens, and
T5: a distance along the optical axis from an image-side surface of the fifth lens to an object-side surface of the sixth lens.

7. The imaging lens according to claim 1, wherein the following conditional expression (8) is satisfied:

$$16.00 < r11/T5 < 200.00 \tag{8}$$

where
r11: a paraxial curvature radius of an object-side surface of the sixth lens, and
T5: a distance along the optical axis from an image-side surface of the fifth lens to an object-side surface of the sixth lens.

* * * * *